(12) United States Patent
Gasparovic et al.

(10) Patent No.: US 12,292,916 B2
(45) Date of Patent: May 6, 2025

(54) SYSTEMS AND METHODS FOR DISPLAYING MEDIA FILES

(71) Applicant: Google LLC, Mountain View, CA (US)

(72) Inventors: Andrew John Gasparovic, Zurich (CH); Andrew Fergus Simpson, San Francisco, CA (US); Christopher Joseph Findeisen, Sunnyvale, CA (US); Rajat Kumar Paharia, Fremont, CA (US); Ravi Gauba, Mountain View, CA (US); Ying Zhang, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/196,759

(22) Filed: May 12, 2023

(65) Prior Publication Data

US 2023/0350939 A1    Nov. 2, 2023

Related U.S. Application Data

(63) Continuation of application No. 17/282,333, filed as application No. PCT/US2018/054861 on Oct. 8, 2018, now Pat. No. 11,657,082.

(51) Int. Cl.
   *G06F 16/438*    (2019.01)
   *H04L 67/1097*   (2022.01)

(52) U.S. Cl.
   CPC ........ *G06F 16/438* (2019.01); *H04L 67/1097* (2013.01)

(58) Field of Classification Search
   CPC .......................... G06F 16/438; H04L 67/1097
   See application file for complete search history.

(56) References Cited

U.S. PATENT DOCUMENTS

| | | | | |
|---|---|---|---|---|
| 7,711,145 B2* | 5/2010 | Gallagher | ............... | G06F 18/29 348/169 |
| 7,904,831 B2* | 3/2011 | Kizaki | ............... | H04N 1/00872 715/741 |
| 8,566,879 B2* | 10/2013 | Nishikawa | ....... | H04N 21/47202 725/43 |
| 9,058,839 B1* | 6/2015 | Corriveau | ............ | H04N 1/3876 |
| 9,230,504 B2* | 1/2016 | Kim | ....................... | B60K 35/00 |

(Continued)

FOREIGN PATENT DOCUMENTS

WO    WO-2020076287 A1 *    4/2020    ............. G06F 16/40

*Primary Examiner* — Shean Tokuta
(74) *Attorney, Agent, or Firm* — Kilpatrick Townsend & Stockton LLP

(57) ABSTRACT

Systems and methods for displaying media files on a device are provided. The device provides a first mode that displays a subset of media files, determined by a user query, from a plurality of media files. Once activated, the first mode persists on the device prior to becoming inactive. A second mode of the device displays the plurality of media files. The second mode is active when the first mode is inactive. An instruction is received from a user. When the instruction specifies the first mode by inclusion of a user query, a corresponding subset of files is obtained from a remote system. The subset of files is sequentially displayed until the period of time has elapsed according to the first mode. When the instruction does not specify a query, the plurality of files is polled for from a remote device and sequentially displayed according to the second mode.

17 Claims, 14 Drawing Sheets

(56) References Cited

U.S. PATENT DOCUMENTS

| | | | |
|---|---|---|---|
| RE45,980 E * | 4/2016 | Ohnishi | G08C 17/00 |
| 10,088,818 B1 | 10/2018 | Mathews et al. | |
| 10,534,832 B1 * | 1/2020 | Miller | H04N 21/6543 |
| 10,657,803 B2 * | 5/2020 | Haupt | G08C 19/02 |
| 11,463,576 B1 * | 10/2022 | Gordon | G06F 3/0482 |
| 2001/0030695 A1 * | 10/2001 | Prabhu | H04N 1/00973 |
| | | | 348/333.01 |
| 2002/0173360 A1 * | 11/2002 | Tanaka | A63F 13/95 |
| | | | 463/44 |
| 2003/0038884 A1 * | 2/2003 | Matsushita | H04N 5/772 |
| | | | 386/E5.072 |
| 2003/0156304 A1 * | 8/2003 | Fedorovskaya | G06V 40/176 |
| | | | 358/527 |
| 2005/0022127 A1 * | 1/2005 | Meyers | G06F 16/4393 |
| | | | 715/825 |
| 2006/0050086 A1 * | 3/2006 | Ono | G06T 11/60 |
| | | | 345/629 |
| 2006/0059427 A1 * | 3/2006 | Reid | G06F 16/58 |
| | | | 715/250 |
| 2008/0292268 A1 * | 11/2008 | Hashiura | H04N 1/212 |
| | | | 386/E5.028 |
| 2009/0037967 A1 * | 2/2009 | Barkan | H04N 21/6582 |
| | | | 725/105 |
| 2009/0058842 A1 * | 3/2009 | Bull | G06F 3/14 |
| | | | 345/212 |
| 2009/0132377 A1 * | 5/2009 | Thompson | G06Q 30/0251 |
| | | | 705/14.69 |
| 2009/0141035 A1 * | 6/2009 | Kodama | G11B 27/034 |
| | | | 345/530 |
| 2009/0185053 A1 * | 7/2009 | Ejima | G11B 27/034 |
| | | | 348/E5.031 |
| 2009/0187558 A1 * | 7/2009 | McDonald | G06F 16/9038 |
| | | | 707/999.005 |
| 2009/0199117 A1 * | 8/2009 | Yamamoto | G06F 16/4393 |
| | | | 715/764 |
| 2009/0293013 A1 * | 11/2009 | O'Shaugnessy | G06F 3/0485 |
| | | | 715/810 |
| 2010/0142762 A1 * | 6/2010 | Morita | G06V 20/35 |
| | | | 382/115 |
| 2010/0162183 A1 * | 6/2010 | Crolley | G06F 3/0482 |
| | | | 715/867 |
| 2010/0325706 A1 * | 12/2010 | Hachey | G06F 21/36 |
| | | | 713/170 |
| 2011/0047368 A1 * | 2/2011 | Sundaramurthy | G06F 1/3203 |
| | | | 713/100 |
| 2011/0069073 A1 * | 3/2011 | Unger | H04W 4/70 |
| | | | 455/41.3 |
| 2011/0164126 A1 * | 7/2011 | Ambor | H04N 7/185 |
| | | | 348/E7.085 |
| 2011/0187884 A1 * | 8/2011 | Kondo | H04N 23/40 |
| | | | 348/222.1 |
| 2011/0258548 A1 * | 10/2011 | Abujbara | G06Q 10/00 |
| | | | 715/730 |
| 2011/0312278 A1 * | 12/2011 | Matsushita | H04W 4/80 |
| | | | 455/66.1 |
| 2012/0124479 A1 * | 5/2012 | Morin | G06Q 10/10 |
| | | | 715/744 |
| 2012/0127196 A1 * | 5/2012 | Landry | G06F 3/147 |
| | | | 345/619 |
| 2012/0131359 A1 * | 5/2012 | Landry | G06F 1/3209 |
| | | | 713/310 |
| 2012/0131465 A1 * | 5/2012 | Telek | H04N 1/00347 |
| | | | 715/733 |
| 2012/0246587 A1 * | 9/2012 | Migishima | G11B 27/34 |
| | | | 715/765 |
| 2012/0249575 A1 * | 10/2012 | Krolczyk | G06F 16/4393 |
| | | | 345/619 |
| 2012/0254168 A1 * | 10/2012 | Shibata | H04N 21/4825 |
| | | | 707/E17.014 |
| 2013/0021369 A1 * | 1/2013 | Denney | H04N 21/4126 |
| | | | 345/620 |
| 2013/0031477 A1 * | 1/2013 | Bilinski | G06F 9/451 |
| | | | 715/716 |
| 2013/0036160 A1 * | 2/2013 | Sasao | G06F 21/105 |
| | | | 709/203 |
| 2013/0132908 A1 * | 5/2013 | Lee | G06F 3/0482 |
| | | | 715/764 |
| 2013/0135226 A1 * | 5/2013 | Ho | G06F 3/04883 |
| | | | 345/173 |
| 2013/0169772 A1 * | 7/2013 | Kim | H04N 13/332 |
| | | | 348/56 |
| 2013/0286223 A1 * | 10/2013 | Latta | H04N 1/00151 |
| | | | 348/207.1 |
| 2014/0096007 A1 * | 4/2014 | Itoh | G06F 16/4393 |
| | | | 715/732 |
| 2014/0172914 A1 | 6/2014 | Elnikety et al. | |
| 2014/0245166 A1 * | 8/2014 | Morton | H04N 1/00912 |
| | | | 715/811 |
| 2014/0359453 A1 * | 12/2014 | Palfreeman | G06F 16/4393 |
| | | | 715/731 |
| 2014/0373057 A1 * | 12/2014 | Hoffert | H04N 21/4312 |
| | | | 725/100 |
| 2015/0212762 A1 * | 7/2015 | Nakamura | H04N 1/0035 |
| | | | 358/1.15 |
| 2016/0171059 A1 * | 6/2016 | Diamond | G06F 16/248 |
| | | | 707/722 |
| 2016/0283483 A1 * | 9/2016 | Jiang | G06F 16/2246 |
| 2017/0134561 A1 * | 5/2017 | Senoo | G06F 3/0482 |
| 2017/0357382 A1 * | 12/2017 | Miura | G06F 3/04842 |
| 2018/0174340 A1 * | 6/2018 | Shah | G06T 11/60 |
| 2018/0204303 A1 * | 7/2018 | Bae | G06T 1/60 |
| 2019/0007507 A1 * | 1/2019 | Lonkar | G06Q 50/01 |
| 2019/0087500 A1 * | 3/2019 | Danyluk | G06F 16/48 |
| 2019/0215480 A1 * | 7/2019 | Ishii | H04N 7/0127 |
| 2020/0097238 A1 * | 3/2020 | Kawase | H04N 1/00506 |
| 2020/0311775 A1 * | 10/2020 | Fernandez | G06Q 10/10 |
| 2021/0141592 A1 * | 5/2021 | Reese | G11B 27/105 |
| 2021/0326373 A1 * | 10/2021 | Gasparic | G06F 16/438 |
| 2022/0179665 A1 * | 6/2022 | Rathod | G06F 9/451 |
| 2023/0350939 A1 * | 11/2023 | Gasparovic | H04L 67/1097 |

\* cited by examiner

600

*(602)* A local device comprises one or more processors, memory storing one or more programs for execution by the one or more processors, a display, and a communication interface in electrical communication with a remote computer system. The one or more programs singularly or collectively use the one or more processors to execute a method.

*(604)* Providing a plurality of modes of the local device. The plurality of modes comprises a first mode configured to display a subset of media files in a plurality of media files. The subset of media files are determined by at least a user query. The first mode, once activated, persists on the local device for a predetermined period of time prior to becoming inactive. The modes also comprises a second mode configured to display the plurality of media files. The second mode is active on the local device in accordance with a determination that the first mode is inactive on the local device.

*(606)* The plurality of media files includes one or more media files that is publically accessible on the Internet, and one or more media files that is associated with the user of the local device.

*(608)* The plurality of media files comprises two or more media files that are associated with any one of a plurality of users of the local device, two or more media files in the plurality of media files is associated with at least one user in the plurality of users, at least one media file in the plurality of media files is associated with a first user of the local device, and at least one media file in the plurality of media files is associated with a second user of the local device.

*(610)* The plurality of media files comprises each media file accessible to the local device having a score value that satisfies a threshold score value.

*(612)* The threshold score value is a media file creation date or a time relative to when the instruction was received by the local device.

*(614)* The score value of a media file having any condition in an enumerated set of conditions, or combination thereof, is down-weighted.

*(616)* The enumerated set of conditions comprises being out of focus, including handwriting, being a printed document, being adult material, and predetermined subject matter that is defined by the user of the local device.

*(618)* The predetermined period of time is determined by a setting of the local device.

*(620)* Receiving an instruction from a user of the local device.

*(622)* The instruction includes a request to display the subset of media files for a predetermined period of time.

*(624)* The instruction is communicated by the user of the local device through a microphone of the local device or a touch display of the local device.

*(626)* When the instruction specifies the first mode by including a user query, responsive to the user query, the subset of media files in the plurality of media files are polled for from the remote computer system across the communication interface. Each respective media file in the subset of media files is sequentially displayed on the display in accordance with the first mode. The sequential displaying is repeated until the predetermined period of time has elapsed. When the instruction does not specify a user query, the plurality of media files are polled for from a device that is remote from the local device. Each media file in the plurality of media files is sequentially displayed in accordance with the second mode.

*(628)* The user query is a request to display publically accessible media files.

*(630)* The user query is a request to display a predetermined subset of media files in the plurality of media files.

*(632)* The user query is a request to display media files in the plurality of media files that include specified subject matter.

*(634)* The specified subject matter is communicated by a user of the local device.

*(636)* The specified subject matter is a location, a time, a face, a color, an artistic style, or a combination thereof.

*(638)* The specified subject matter is a subject matter that is captured by a camera of the local device.

*(640)* The subject matter that is captured by the camera of the local device is determined by the remote computer system.

*(642)* The sequentially displaying the media files collectively displays the media files for the predetermined period of time by successively displaying each respective media file for a portion of the predetermined period of time.

*(644)* The predetermined period of time is determined according to a number of media files in the media files as determined by the active mode of the local device.

*(646)* Receiving from the remote computer system, responsive to the instruction and without human interaction, one or more media files in the subset of media files that is accessible to the remote computer system.

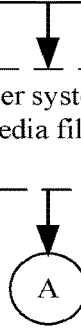

Figure 6C

SYSTEMS AND METHODS FOR DISPLAYING MEDIA FILES

CROSS-REFERENCES TO RELATED APPLICATIONS

This application is a continuation of U.S. patent application Ser. No. 17/282,333 filed on Apr. 1, 2021, which is a U.S. National Stage Application of PCT International Application No. PCT/US2018/054861, filed on Oct. 8, 2018. The entire disclosures of each of the aforementioned applications are hereby incorporated by reference, for all purposes, as if fully set forth herein.

TECHNICAL FIELD

This application relates generally to electronic devices, including but not limited to a display assistant device that is used to display media files.

BACKGROUND

Electronic devices integrated with cameras are extraordinarily popular. These devices are widely used to capture and save an ever expanding collection of media files such as digital photos. This collection of media files holds cherished memories of the photographer, but viewing these media files becomes cumbersome since they are stored on local devices such as phones and computers or stored on a cloud server. Additionally, viewing the media files is time consuming due to the sheer number of media files typically associated with a user as well as the fact that viewing the media files is an active task since each media file must be located and acted upon, for instance by selecting the media file from among several listed media files in a directory.

Previous attempts to bring these media files into a physical environment, such as conventional digital picture frame devices, have been unsatisfactory. For instance, users must actively select particular media files to create an album, then store the album on the digital picture frame device. Updating the album in the digital picture frame device typically requires the user to create a new selection of media files, remove the previously stored media files from the digital picture frame device, and store these new media files on the frame device. This is tedious and time consuming. Additionally, conventional digital picture frame devices often are a distraction because they tend to default toward having display settings that produce bright glowing screens with sharp transitions occurring between the consecutive display of media files. Such settings tend to draw the user's attention to the frame unwantedly and to cause needless distraction. Such distraction leads to the conventional digital picture frame being turned off or even discarded, since the device is no longer augmenting, but instead distracting from, its surrounding environment.

Given the prevalence and importance of media files, what is needed in the art are improved devices for display of such media files in a physical environment in a non-distracting manner without a need to manually curate the media files.

SUMMARY

The present disclosure addresses the above-identified shortcomings by providing electronic devices and methods that are applicable to a home or office environment for the provision of a distraction-free interface that displays a selection of automatically curated media files. Further, various modes of display, according to the media files that are being displayed, are provided.

In accordance with one aspect of the present disclosure, a method of displaying media files is provided at a local device. The local device includes one or more processors, memory storing one or more programs for execution by the one or more processors, a display, and a communication interface in electrical communication with a remote computer system. The one or more programs singularly or collectively use the one or more processors to execute the method. The method includes providing a plurality of modes of the local device, including a first mode that is configured to display a subset of media files in a plurality of media files. This subset of media files is determined, at least in part, by a user query. Once activated, the first mode persists on the local device for a predetermined period of time prior to becoming inactive.

The plurality of modes also includes a second mode that is configured to display the plurality of media files at times when the first mode is not being used to display the plurality of media files. Therefore, the second mode is active on the local device in accordance with a determination that the first mode is inactive on the local device.

The method also includes receiving an instruction from a user of the local device. When the instruction specifies the first mode by including a user query, responsive to this user query, a subset of media files in the plurality of media files is polled for from the remote computer system across the communication interface. That is, the user query provides a request for a certain media files, such as media files that have been tagged with a subject, person, place or thing, and the subset of files from among the plurality of files associated with the user of the local device is obtained from the remote server. Then, each respective media file in the subset of media files is sequentially displayed on the display in accordance with the first mode. For instance, the first mode specifies how long each respective media file is to be displayed. The sequential displaying of each media file in the subset of media files is repeated until the predetermined period of time associated with the first mode has elapsed and/or a certain number of repeats of the subset of the display of the entire subset of media files has occurred. For example, in the case where the predetermined period is four hours, after four hours has elapsed without further user interact with the local device, the first mode terminates or, in other words, reverts to the second mode in which digital media files from among the entire plurality of digital media files available through the remote server computer are obtained and sequentially displayed on the local device without any consideration for a filtering command provided by the user. That is, in some embodiments, in the case where the active mode in which a subset of digital media files is being displayed terminates, the local device reverts to the second mode in which any of the digital media files associated with any of the users associated with the local device are sequentially displayed on the local device. In some embodiments, the user can override the second mode at any time by reissuing the original instruction, manually turn off the second mode, or issue a new instruction for a new subset of digital media files.

In instances where the instruction from the user discussed above does not specify a user query, the plurality of media files is polled for from the remove device in accordance with the second mode. Each media file in the plurality of media files is sequentially displayed in accordance with the second mode.

In some embodiments, the plurality of digital media files includes one or more media files that are publically accessible on the Internet, and/or one or more digital media files that are associated with the user of the local device.

In some embodiments, the plurality of digital media files includes two or more digital media files that are associated with any one of a plurality of users of the local device. In some embodiments, two or more digital media files in the plurality of digital media files is associated with at least one user in the plurality of users. Moreover, in some embodiments, at least one digital media file in the plurality of digital media files is associated with a first user of the local device. Further, in some embodiments, at least one digital media file in the plurality of digital media files is associated with a second user of the local device.

In some embodiments, the method further includes receiving from the remote computer system, responsive to the user instruction and without further human interaction, one or more digital media files in the subset of digital media files that is accessible to the remote computer system.

In some embodiments, the user instruction includes a request to display the subset of digital media files for a predetermined period of time. In some embodiments, this predetermined period of time is an amount of time in which the entire subset of digital media files is to be collectively displayed on a sequential basis. In other embodiments, this predetermined period of time is an amount of time each digital media file in the subset of digital media files is to be displayed. In some embodiments, the predetermined period of time is determined by a setting of the local device.

In some embodiments, the user query described above is a request to display publically accessible media files. In some embodiments, the user query is a request to display a predetermined subset of media files in the plurality of media files. In some embodiments, the user query is a request to display media files in the plurality of media files that include specified subject matter, such as subject matter that is captured by a camera of the local device. In some embodiments, the subject matter that is captured by the camera of the local device is determined by the remote computer system. In some embodiments, the specified subject matter is communicated by a user of the local device. In some embodiments, the specified subject matter is a location, a time, a face, a color, an artistic style, or a combination thereof.

In some embodiments, the plurality of media files includes each media file accessible to the local device having a score value that satisfies a threshold score value. In some embodiments, the threshold score value is a media file creation date or a time relative to when the instruction was received by the local device.

In some embodiments, the score value of a media file, where the media file has any condition in an enumerated set of conditions, or combination thereof, is down-weighted because the media file has this condition or combination of conditions. For example, in some embodiments, the enumerated set of conditions includes being out of focus, including handwriting, being a printed document, being adult material, and/or predetermined subject matter that is defined by the user of the local device.

In some embodiments, the instruction is communicated by the user of the local device through a microphone of the local device or a touch display of the local device.

In some embodiments, the sequential display of the media files in accordance with the first mode collectively displays the media files for a predetermined period of time by successively displaying each respective media file for a portion of the predetermined period of time. In some embodiments, this predetermined period of time is determined according to a number of media files in the subset of media files as determined by the active mode of the local device.

In some embodiments, the method further includes receiving, at the local device from the user of the local device, an instruction, and executing, at the local device, the instruction received from the user. For instance, in some embodiments, the instruction modifies a visual aspect (e.g., an orientation of the respective media file, an aspect ratio of the respective media file, a level of magnification of the respective media file, or a combination thereof) of a respective media file that is currently displayed on the local device. In some embodiments, the instruction communicates a media file that is currently displayed on the local device to the remote computer system. In some embodiments, the instruction overlays a remark to a media file or annotates a media file that is currently displayed on the local device.

In some embodiments, the method disclosed above is repeated a plurality of times. In some such embodiments, each instruction is a temporally successive instance of the same instruction. In other embodiments, the method is repeated a plurality of times and each repeated instance of the method include a different user instruction.

Another aspect of the present disclosure provides a system for displaying media files on a device that includes one or more processors, memory storing one or more programs for execution by the one or more processors, a display, and a communication interface in electrical communication with a remote computer system. The one or more programs singularly or collectively use the one or more processors to execute a method, including providing a plurality of modes of the local device. The plurality of modes includes a first mode that is configured to display a subset of media files in a plurality of media files. This subset of media files is determined by at least a user query. Once activated, the first mode persists on the local device for a predetermined period of time prior to becoming inactive and reverting to a second mode in the plurality of modes. The second mode is configured to sequentially display each media file in the plurality of media files associated with the users associated with the local device, rather than just the above-referenced subset. Accordingly, the second mode is active on the local device in accordance with a determination that the first mode is inactive on the local device. The method also includes receiving an instruction from a user of the local device. When the instruction specifies the first mode by including a user query, responsive to this user query, a subset of media files in the plurality of media files is polled for from the remote computer system across the communication interface based on the instruction. Each respective media file in the subset of media files is sequentially displayed on the display in accordance with the first mode. The sequential display of each media file in the subset of media files is repeated until the predetermined period of time has elapsed and/or a certain number of repeats of the subset of the display of the entire subset of media files has occurred. Furthermore, when the instruction does not specify a user query, the full plurality of media files is polled for from the remote device by the local device. Each media file in the plurality of media files is sequentially displayed in accordance with the second mode.

Yet another aspect of the present disclosure provides a non-transitory computer readable storage medium. The non-transitory computer readable storage medium includes one or more programs for execution by one or more processors of a computer system. The one or more programs include one or more instructions. The one or more instructions include instructions for providing a plurality of modes of the local device. The plurality of modes includes a first mode configured to display a subset of media files in a plurality of media files that is determined by at least a user query. Once activated by the user query, the first mode persists on the local device for a predetermined period of time prior to becoming inactive and reverting to a second mode that is configured to sequentially display digital media files in the full plurality of media files. Accordingly, the second mode is active on the local device in accordance with a determination that the first mode is inactive on the local device. The method also includes receiving an instruction from a user of the local device. When the instruction specifies the first mode by including a user query then, responsive to the user query, a subset of media files in the plurality of media files is polled for from the remote computer system across the communication interface in accordance with the requirements of the user query. Each respective media file in the subset of media files is sequentially displayed on the display in accordance with the first mode. The sequential display of each media file in the subset of media files is repeated until the predetermined period of time has elapsed and/or a number of repetitions of the subset of media files has been fulfilled. Furthermore, when the instruction does not specify a user query, the plurality of media files is polled for from the remote device by the local device. Each respective media file in the plurality of media files is sequentially displayed in accordance with the second mode.

In accordance with various embodiments of this application, the display device provides users with curated digital media. The curation of this digital media prevents unwanted digital media from being displayed, such as pornographic material or pictures of receipts, while selecting the best photos for the user. Additionally, the curation of this digital media proceeds on an ongoing basis thereby ensuring that the freshness of the digital media is maintained. The user may also instruct the local device to display particular digital media as discussed above. Accordingly, the local device determines digital media files to display according to such user instructions thereby allowing user control over the content displayed by the local device with minimal human interaction.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIGS. 6A, 6B, 6C, and 6D collectively illustrate a flow chart of a method of displaying media content on a display assistant device in accordance with an embodiment of the present disclosure, in which optional portions are illustrated using a dashed-line or dashed-box.

Like reference numerals refer to corresponding parts throughout the several views of the drawings.

DESCRIPTION OF IMPLEMENTATIONS

Figure 1:
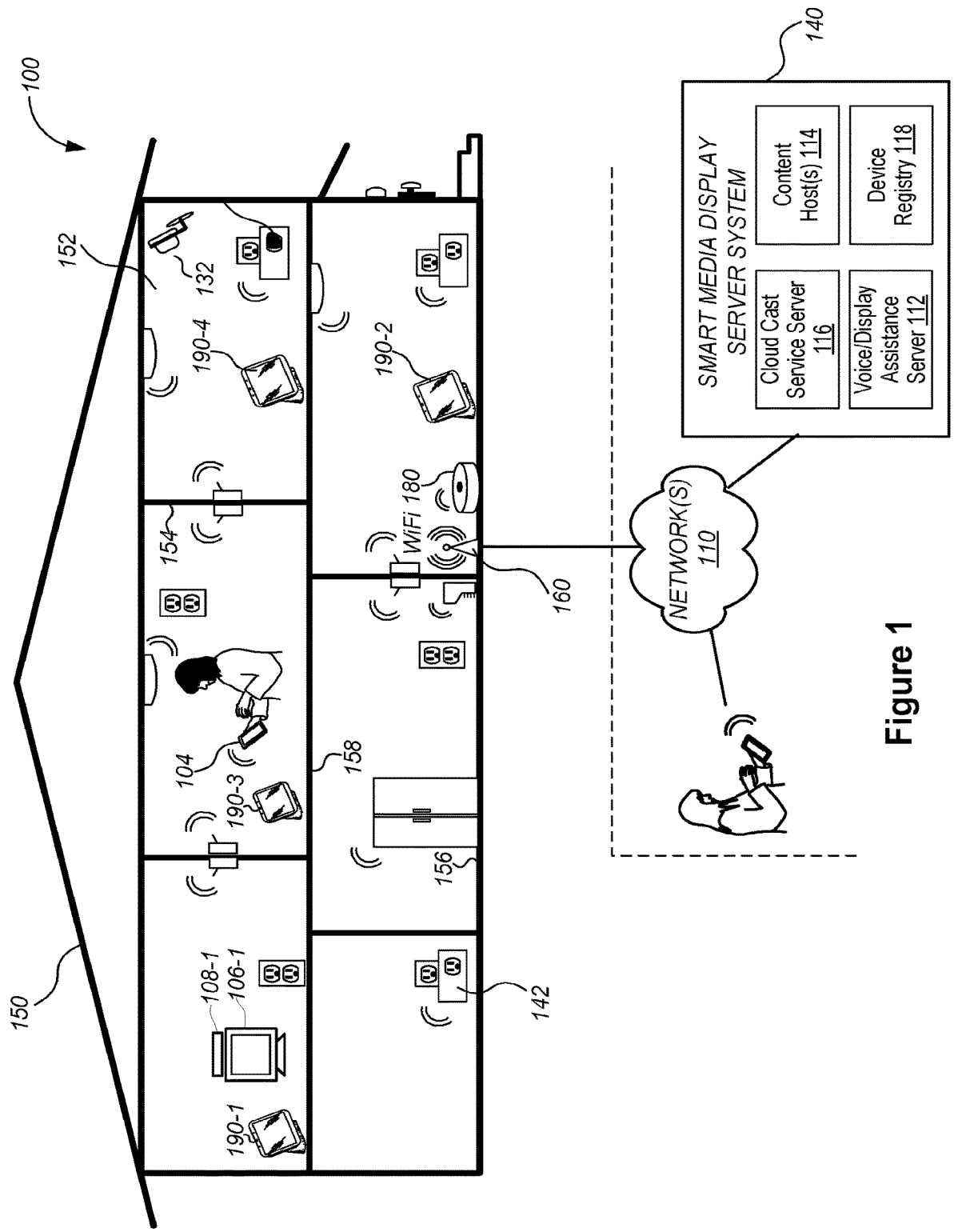
FIG. 1 is an example smart home environment in accordance an embodiment of the present disclosure.

While digital revolution has provided many benefits ranging from openly sharing information to a sense of global community, emerging new technology often induces confusion, skepticism and fear among consumers, preventing consumers from benefitting from the technology. This sharing of information has led to consumers having an excess library of media content, which is too large for the owner to curate. For instance, some consumers take hundreds of photos at various outings as well as photos of important documents and notes, which are incorporated into the growing library of media content. While previous devices have attempted to display this library of media content in a physical environment, such as digital picture frames, the devices lack an ability to automatically curate the library of media, or to display a subset of media from the library as directed by a user.

In accordance with some implementations of the invention, a voice-activated electronic device includes a screen configured to provide additional visual information (e.g., display media content) in addition to audio information that can be broadcast via a speaker of the voice-activated electronic device. The electronic device may display all of the media content accessible to the device, or may display a selection of the media content accessible to the device. The media files that are accessible to the device are curated to prevent unwanted media. Moreover, in some embodiments the selection of media content is provided by a user instruction or is a predetermined selection of media content. The user may instruct the electronic device to overlay remarks and/or annotations to media content that is currently being displayed. The user may also instruct the electronic device to share media content with contacts of the user. In this way, the electric device displays exceptional media content to the user with minimal human interaction.

Specifically, a device for displaying media files is provided. The device provides a first mode that displays a subset of media files, which are determined by a user query, from a plurality of media files. Once activated, the first mode persists on the device for a period of time prior to becoming inactive. The device also provides a second mode that displays the plurality of media files. The second mode is active on the device if the first mode is inactive on the device. An instruction is received from a user of the device. When the instruction specifies the first mode via a user query, the subset of files is polled for from a remote system.

Each respective file in the subset of files is sequentially displayed until the period of time has elapsed according to the first mode. When the instruction does not specify a user query, the plurality of files is polled for from a remote device. Each media file is sequentially displayed according to the second mode.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

FIG. 1 is an example smart home environment 100 in accordance with some implementations. The smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. The depicted structure 150 includes a plurality of rooms 152, separated at least partly from each other via walls 154. The walls 154 may include interior walls or exterior walls. Each room may further include a floor 156 and a ceiling 158.

One or more media devices are disposed in the smart home environment to provide media content that is stored at a local content source or streamed from a remote content source (e.g., content host(s) 114). The media devices can be classified to two categories: media output devices 106 that directly output the media content to audience, and cast devices 108 that are networked to stream media content to the media output devices 106. Examples of the media output devices 106 include, but are not limited to television (TV) display devices and music players. Examples of the cast devices 108 include, but are not limited to, set-top boxes (STBs), DVD players and TV boxes. In the example smart home environment 100, the media output devices 106 are disposed in more than one location, and each media output device 106 is coupled to a respective cast device or includes an embedded casting unit. The media output device 106-1 includes a TV display that is hard wired to a DVD player or a set top box 108-1. The media output device 106-2 includes a smart TV device that integrates an embedded casting unit to stream media content for display to its audience. The media output device 106-3 includes a regular TV display that is coupled to a TV box 108-3 (e.g., Google TV or Apple TV products), and such a TV box 108-3 streams media content received from a media content host server 114 and provides an access to the Internet for displaying Internet-based content on the media output device 106-3.

In addition to the media devices 106 and 108, one or more electronic devices 190 are disposed in the smart home environment 100 to collect audio inputs for initiating various media play functions of the devices 190 and/or media devices 106 and 108. In some implementations, the devices 190 are configured to provide media content that is stored locally or streamed from a remote content source. In some implementations, these voice-activated electronic devices 190 (e.g., devices 190-1, 190-2 and 190-3) are disposed in proximity to a media device, for example, in the same room with the cast devices 108 and the media output devices 106. Alternatively, in some implementations, a voice-activated electronic device 190-4 is disposed in a room having one or more smart home devices but not any media device. Alternatively, in some implementations, a voice-activated electronic device 190 is disposed in a location having no networked electronic device. This allows for the devices 190 to communicate with the media devices and share content that is being displayed on one device to another device (e.g., from device 190-1 to device 190-2 and/or media devices 108).

The electronic device 190 includes at least one microphones, a speaker, a processor and memory storing at least one program for execution by the processor. The speaker is configured to allow the electronic device 190 to deliver voice messages to a location where the electronic device 190 is located in the smart home environment 100, thereby broadcasting information related to a current media content being displayed, reporting a state of audio input processing, having a conversation with or giving instructions to a user of the electronic device 190. For instance, in some embodiments, in response to a user query the device provides audible information to the user through the speaker. As an alternative to the voice messages, visual signals could also be used to provide feedback to the user of the electronic device 190 concerning the state of audio input processing, such as a notification displayed on the device.

In accordance with some implementations, the electronic device 190 is a voice interface device that is network-connected to provide voice recognition functions with the aid of a cloud cast service server 116 and/or a voice/display assistance server 112. For example, the electronic device 190 includes a smart speaker that provides music (e.g., audio for video content being displayed) to a user and allows eyes-free and hands-free access to voice assistant service (e.g., Google Assistant). Optionally, the electronic device is a simple and low cost voice interface device, e.g., a speaker device and a display assistant device (including a display screen having no touch detection capability).

In some implementations, the voice-activated electronic devices 190 includes a display assistant device (e.g., 190-2 and 190-4) that integrates a display screen in addition to the microphones, speaker, processor and memory. The display screen is configured to provide additional visual information (e.g., media content, information pertaining to media content, etc.) in addition to audio information that can be broadcast via the speaker of the voice-activated electronic device 190. When a user is nearby and his or her line of sight is not obscured, the user may review the additional visual information directly on the display screen of the display assistant device. Optionally, the additional visual information provides feedback to the user of the electronic device 190 concerning the state of audio input processing. Optionally, the additional visual information is provided in response to the user's previous voice inputs (e.g., user queries), and may be related to the audio information broadcast by the speaker. In some implementations, the display screen of the voice-activated electronic devices 190 includes a touch display screen configured to detect touch inputs on its surface (e.g., instructions provided through the touch display screen). Alternatively, in some implementations, the display screen of the voice-activated electronic devices 190 is not a touch display screen, which is relatively expensive and can compromise the goal of offering the display assistant device 190 as a low cost user interface solution.

When voice inputs from the electronic device 190 are used to control the electronic device 190 and/or media output devices 106 via the cast devices 108, the electronic device 190 effectively enables a new level of control of cast-enabled media devices independently of whether the electronic device 190 has its own display. In an example, the electronic device 190 includes a casual enjoyment speaker with far-field voice access and functions as a voice interface device for Google Assistant. The electronic device 190 could be disposed in any room in the smart home environment 100. When multiple electronic devices 190 are distributed in multiple rooms, they become audio receivers that are synchronized to provide voice inputs from all these rooms. For instant, a first electronic device 190 may receive a user instruction that is directed towards a second electronic device 190-2 (e.g., a user instruction of "OK Google, show this photo album on the Kitchen device.").

Specifically, in some implementations, the electronic device 190 includes a WiFi speaker with a microphone that is connected to a voice-activated personal assistant service (e.g., Google Assistant). A user could issue a media play request via the microphone of electronic device 190, and ask the personal assistant service to play media content on the electronic device 190 itself and/or on another connected media output device 106. For example, the user could issue a media play request by saying to the Wi-Fi speaker "OK Google, Only show photos of my cats for the next two hours on all connected devices." The personal assistant service then fulfils the media play request by playing the requested media content on the requested devices using a default or designated media application.

A user could also make a voice request via the microphone of the electronic device 190 concerning the media content that has already been played and/or is being played on a display device. For instance, a user may instruct the device to provide information related to a current media content being displayed, such as ownership information or subject matter of the media content. In some implementations, closed captions of the currently displayed media content are initiated or deactivated on the display device by voice when there is no remote control or a second screen device is available to the user. Thus, the user can turn on the closed captions on a display device via an eyes-free and hands-free voice-activated electronic device 190 without involving any other device having a physical user interface, and such a voice-activated electronic device 190 satisfies federal accessibility requirements for users having hearing disability. In some implementations, a user wants to take a current media session with them as they move through the house. This requires the personal assistant service to transfer the current media session from a first cast device to a second cast device that is not directly connected to the first cast device or has no knowledge of the existence of the first cast device. Subsequent to the media content transfer, a second output device 106 coupled to the second cast device 108 continues to play the media content previously a first output device coupled to the first cast device 108 from the exact point within a photo album or a video clip where play of the media content was forgone on the first output device 106.

In some implementations, the voice-activated electronic devices 190, smart home devices could also be mounted on, integrated with and/or supported by a wall 154, floor 156 or ceiling 158 of the smart home environment 100 (which is also broadly called as a smart home environment in view of the existence of the smart home devices).

In some embodiments, the smart home devices in the smart home environment 100 includes, but is not limited to, one or more intelligent, multi-sensing, network-connected camera systems 132. In some embodiments, content that is captured by the camera systems 132 is displayed on the electronic devices 190 at a request of a user (e.g., a user instruction of "OK Google, Show the baby room monitor.") and/or according to settings of the home environment 100 (e.g., a setting to display content captured by the camera systems during the evening or in response to detecting an intruder).

In some implementations, each of the voice-activated electronic devices is capable of data communications and information sharing with other voice-activated electronic devices 190, a central server or cloud-computing system 140, and/or other devices that are network-connected. Data communications is carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the electronic devices 190 serve as wireless or wired repeaters. In some embodiments, the electronic devices 190 further communicates with each other via a connection (e.g., network interface 160) to a network, such as the Internet 110. Through the Internet 110, the cast devices 108, and the electronic devices may communicate with a smart server system 140 (also called a central server system and/or a cloud-computing system herein). Optionally, the smart server system 140 is associated with a manufacturer, support entity, or service provider associated with the cast devices 108 and the media content displayed to the user.

Accordingly, in some embodiments the smart server system 140 includes a voice/display assistance server 112 that processes audio inputs collected by voice-activated electronic devices 190, one or more content hosts 114 (e.g., databases of a cloud server) that provide the media content, a cloud cast service server 116 creating a virtual user domain based on distributed device terminals, and a device registry 118 that keeps a record of the distributed device terminals in the virtual user environment. Examples of the distributed device terminals include, but are not limited to the voice-activated electronic devices 190, cast devices 108, media output devices 106 and smart home devices (e.g., camera system 132). In some implementations, these distributed device terminals are linked to a user account (e.g., a Google user account) in the virtual user domain. Furthermore, in some implementations each display device 190 is linked to one or more user accounts. Accordingly, in some implementation a device 190 only have access to display media content that is associated with the user accounts of the device (e.g., photo albums of the user accounts).

In some implementations, the network interface 160 includes a conventional network device (e.g., a router). The smart home environment 100 of FIG. further includes a hub device 180 that is communicatively coupled to the network(s) 110 directly or via the network interface 160. The hub device 180 is further communicatively coupled to one or more of the above intelligent, multi-sensing, network-connected devices (e.g., the cast devices 108, the electronic devices 190, the smart home devices and the client device 104). Each of these network-connected devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled network-connected devices, configure the hub device to interoperate with devices newly introduced to the home network, commission new devices, and adjust or view settings of connected devices, etc.

Figure 2A:
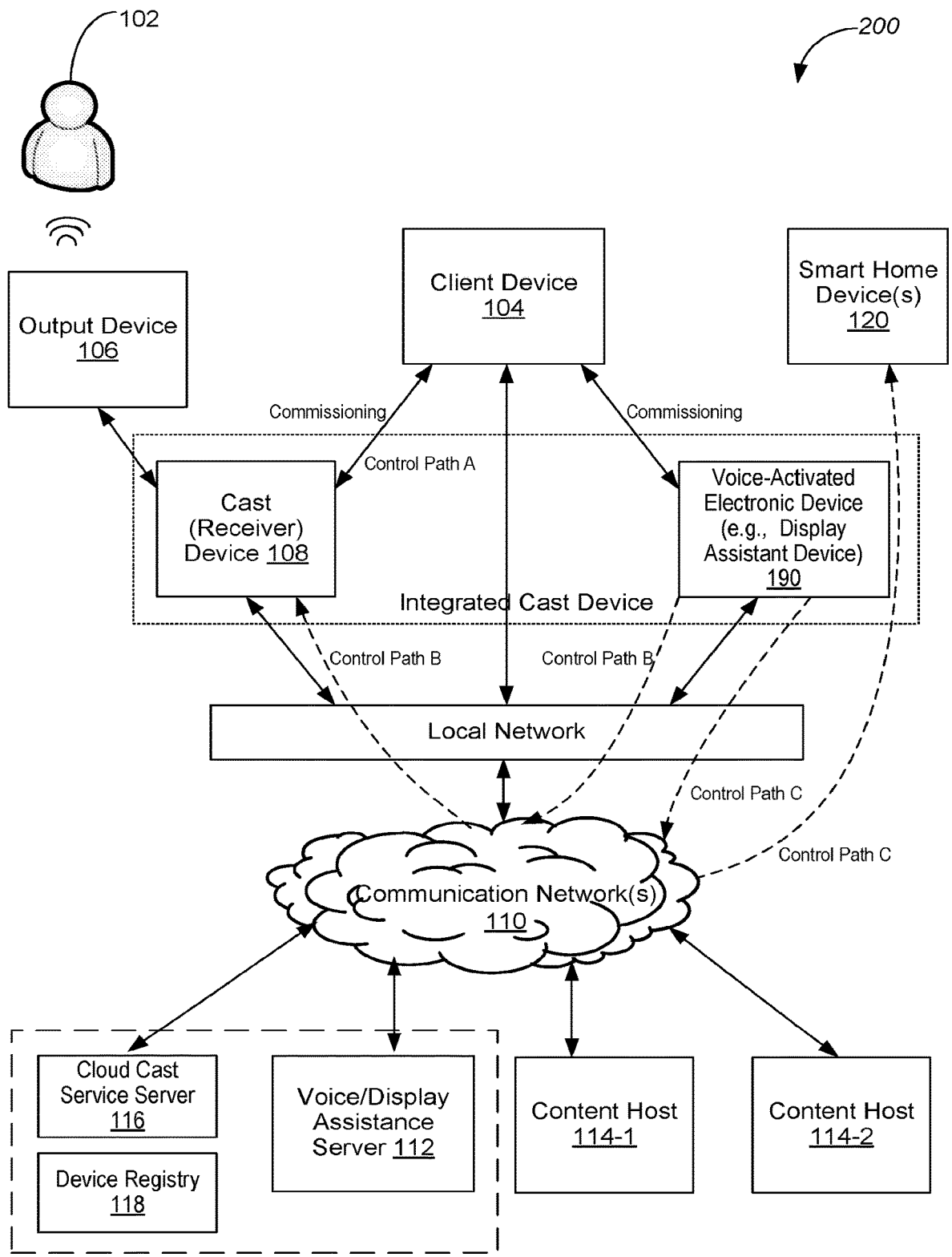
FIG. 2A is an example operating environment in which a voice-activated electronic device (e.g., a display assistant device) interacts with a cast device, a client device or a server system of a smart home environment in accordance with an embodiment of the present disclosure.

FIG. 2A is an example operating environment 200 in which a voice-activated electronic device 190 (e.g., a display assistant device) interacts with a cast device 108, a client device 104 or a server system 140 of a smart home environment 100 in accordance with some implementations of the present disclosure. The voice-activated electronic device 190 is configured to receive audio inputs from an environment in proximity to the voice-activated electronic device 190 (e.g., a user of the device). Optionally, the electronic device 190 stores the audio inputs and at least partially processes the audio inputs locally (e.g., processes a user query). Optionally, the electronic device 190 transmits the received audio inputs or the partially processed audio inputs to a voice/display assistance server 112 via the communication networks 110 for further processing. The cast device 108 is configured to obtain media content or Internet content from one or more content hosts 114 for display on an output device 106 coupled to the cast device 108. As explained above, the cast device 108 and the voice-activated electronic device 190 are linked to each other in a user domain, and more specifically, associated with each other via a user account in the user domain. Information of the cast device 108 and information of the electronic device 190 are stored in the device registry 118 in association with the user account.

In some implementations, one or more of the contents hosts 114 is a database that stores media files associated with a plurality of users. Similarly, in some implementations one or more of the content hosts 114 is a media content provider that provides media content. The media content provided by the content hosts in such implementations may be private media content (e.g., media content that is licensed from the content provider such as works of art), or pubic media content (e.g., a library of generic stock media).

In some implementations, the cast device 108 does not include any display screen, and the voice-activated electronic device 190 includes a display assistant device that has a display screen. Both the cast device 108 and the display assistant device 190 have to rely on the client device 104 to provide a user interface during a commissioning process. Specifically, the client device 104 is installed with an application that enables a user interface to facilitate commissioning of a new cast device 108 or a new display assistant device 190 disposed in proximity to the client device 104. In some embodiments, a user sends a request on the user interface of the client device 104 to initiate a commissioning process for the new cast device 108 or display assistant device 190 that needs to be commissioned. After receiving the commissioning request, the client device establishes a short range communication link with the new cast device 108 or display assistant device 190 that needs to be commissioned. Optionally, the short range communication link is established based near field communication (NFC), Bluetooth, Bluetooth Low Energy (BLE) and the like. The client device 104 then conveys wireless configuration data associated with a wireless local area network (WLAN) to the new cast device 108 or display assistant device 190. The wireless configuration data includes at least a WLAN security code (i.e., service set identifier (SSID) password), and optionally includes an SSID, an Internet protocol (IP) address, proxy configuration and gateway configuration. After receiving the wireless configuration data via the short range communication link, the new cast device 108 or display assistant device 190 decodes and recovers the wireless configuration data, and joins the WLAN based on the wireless configuration data.

Additional user domain information is entered on the user interface displayed on the client device 104, and used to link the new cast device 108 or display assistant device 190 to an account in a user domain. Optionally, the additional user domain information is conveyed to the new cast device 108 or display assistant device 190 in conjunction with the wireless communication data via the short range communication link. Optionally, the additional user domain information is conveyed to the new cast device 108 or display assistant device 190 via the WLAN after the new device has joined the WLAN.

Once the cast device 108 and display assistant device 190 have been commissioned into the user domain, the cast device 108, the output device 106 and their associated media play activities could be controlled via two control paths (control path A and control path B). In accordance with control path A, a cast device application or one or more media play applications installed on the client device 104 are used to control the cast device 108 and its associated media play activities. Alternatively, in accordance with control path B, the display assistant device 190 is used to enable eyes-free and hands-free control of the cast device 108 and its associated media play activities (e.g., playback of media content play on the output device 106), as well as to display media on the device itself.

In some implementations, the cast device 108 and display assistant device are two distinct and different devices that are configured to act as a cast receiver device and a cast transmitter device, respectively. The display assistant device 190 can provide information or content (which is generated locally or received from another source) to be projected onto the output device 106 via the cast device 108. Alternatively, in some implementations, the cast device 108 and display assistant device 190 are combined in an integrated cast device that is coupled to the output display assistant device 190.

In some implementations, the smart home environment 100 includes one or more smart home devices 120 (e.g., camera systems 132 in FIG. 1). Regardless of whether a smart home device 120 has a display screen, it can rely on the client device 104 and/or display assistant device 190 to provide a user interface during a commissioning process. Specifically, the client device 104 is installed with a smart device application that enables a user interface to facilitate commissioning of a new smart home device 120. Like a new cast device 108 or display assistant device 190, the new smart home device 120 can establish a short range communication link with the client device 104, and the wireless configuration data are communicated to the new smart home device 120 via the short range communication link, allowing the smart home device 120 to join the WLAN based on the wireless configuration data. Further, the smart home device 120 is optionally linked to the account of the user domain to which the cast device 108 and display assistant device 190 are linked as well. Once the smart home device 120 and the display assistant device 190 have been commissioned into the user domain, the smart home device 120 could be monitored and controlled via the display assistant device 190 in accordance with Control Path C as the cast device 108 is controlled via the display assistant device 190 in accordance with Control Path B. For example, voice commands can be inputted into the display assistant device 190 to review recording of an outdoor camera 132 mounted next to a door and control a door lock based on security events detected in the recordings.

Referring to FIG. 2A, after the cast device 108 and the voice-activated electronic device 190 are both commissioned and linked to a common user domain, the voice-activated electronic device 190 can be used as a voice user interface to enable eyes-free and hands-free control of media content streaming to the cast device 108 involving no remote control, client device 104, other electronic devices 190, and/or other second screen device. In one example, the user gives voice commands such as "Show photos of Morgan and I on the Kitchen display." Accordingly, a photo or video clip is streamed to a cast device 108 and/or electronic device 190 associated with the "Kitchen display." The client device 104 is not involved, nor is any cast device application or media play application loaded on the client device 104.

The cloud cast service 116 is the proxy service that communicatively links the voice-activated electronic device 190 to the cast device 108 and makes casting to the cast device 108 possible without involving any applications on the client device 104. For example, a voice message is recorded by an electronic device 190, and the voice message is configured to request media play on a media output device 106. Optionally, the electronic device 190 partially processes the voice message locally. Optionally, the electronic device 190 transmits the voice message or the partially processed voice message to a voice/display assistance server 112 via the communication networks 110 for further processing. A cloud cast service server 116 determines that the voice message includes a first media play request (e.g., a user query for media content), and that the first media play request includes a user voice command to play media content on a media output device and/or an electronic device 190 and a user voice designation of the media output device 106 and/or the electronic device 190. The user voice command further includes at least information the media content (e.g., photos and/or videos that include Morgana as a subject matter) that needs to be played. Furthermore, in some embodiments the user voice command further includes an instruction for the electronic device 190 to implement, such as a modification to a particular media content or to share media content with another user.

In accordance with the voice designation of the media output device, the cloud cast service server 116 in a device registry 118 a cast device associated in the user domain with the electronic device 190 and coupled to the media output device 106. The cast device 108 is configured to execute one or more media play applications for controlling the media output device 106 to play media content received from one or more media content hosts 114. Then, the cloud cast service server 116 sends to the cast device a second media play request including the information of the first media play application and the media content that needs to be played. Upon receiving the information sent by the cloud cast service server 116, the cast device 108 executes the first media play application and controls the media output device 106 to play the requested media content.

In some implementations, the user voice designation of the media output device 106 and/or an electronic device 190 includes description of the destination media output device and/or electronic device. The cloud cast service server 116 identifies in the registry the destination media output device and/or the electronic device 190 among a plurality of media output devices and/or a plurality of electronic device 190 according to the description of the destination media output device and/or the electronic device. In some implementations, the description of the destination media output device and/or the electronic device includes at least a brand ("Samsung TV") or a location of the media output device 106 and/or the electronic device 190 ("my Living Room device").

Figure 2B:
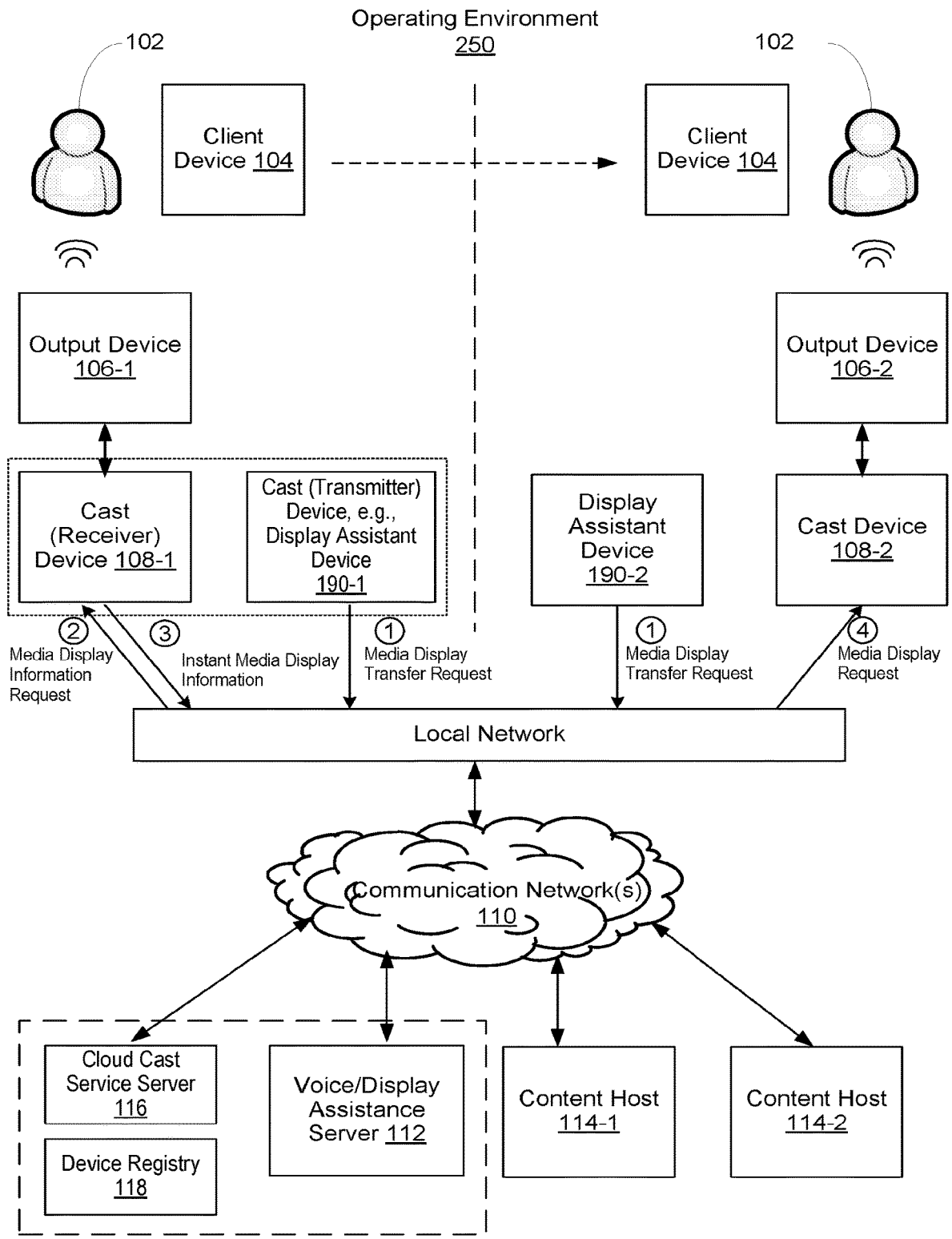
FIG. 2B is another example operating environment in which voice-activated electronic devices interact with cast devices, client devices or a server system of a smart home environment in accordance with an embodiment of the present disclosure.

FIG. 2B is another example operating environment 250 in which voice-activated electronic devices 190 interact with cast devices 106, client devices 104, other electronic devices 190, and/or a server system 140 of a smart home environment 100 in accordance with some implementations of the present disclosure. The smart home environment 100 includes a first cast device 108-1 and a first output device 106-1, or a first electronic device 190-1, coupled to the first cast device 108-1. The smart home environment 100 also includes a second cast device 108-2 and a second output device 106-2, or second electronic device 190-2, coupled to the second cast device 108-2. The cast devices 108-1 and 108-2, or electronic devices 190-1 and 190-2, are optionally located in the same location (e.g., the living room) or two distinct locations (e.g., two rooms) in the smart home environment 100. Each of the cast devices 108-1 and 108-2, or the electronic devices 190, is configured to obtain media or Internet content from media hosts 114 for display on the output device 106 coupled to the respective cast device 108-1 or 108-2 and/or the electronic devices 190. Both the first and second cast devices, or the electronic devices 190, are communicatively coupled to the cloud cast service server 116 and the content hosts 114.

The smart home environment 100 further includes one or more voice-activated electronic devices 190 that are communicatively coupled to the cloud cast service server 116 and the voice/display assistance server 112. The one or more voice-activated electronic devices 190 includes at least one display assistant device (e.g., display assistant device 190-2). In some implementations, the voice-activated electronic devices are disposed independently of the cast devices 108 and the output devices 106. For example, as shown in FIG. 1, the electronic device 190-4 is disposed in a room where no cast device 108 or output device 106 is located. In some implementations, the first electronic device 190-1 is disposed in proximity to the first cast device 108-1 and the first output device 106-1, e.g., the first electronic device 190-1, the first cast device 108-1 and the first output device 106-1 are located in the same room. Optionally, the second electronic device 190-2 is disposed independently of or in proximity to the second cast device 108-2 and the second output device 106-2.

In some embodiments, when media content is being played on the first output device 106-1 or the electronic device 190, a user sends a voice command to any of the electronic devices 190 (e.g., 190-1 or 190-2 in FIG. 2B) to request play of the media content to be transferred to the second output device 106-2 or a second electronic device 190-2. The voice command includes a media play transfer request (e.g., a user instruction to transfer the media content). The voice command is transmitted to the cloud cast service server 116. The cloud cast service server 116 sends a media display information request to the first cast device 108-1 to request instant media play information of the media content that is currently being played on the first output device 106-1 coupled to the first cast device 108-1. The first cast device 108-1 then returns to the cloud cast service server the requested instant play information including at least information the media content that is currently being played (e.g., "Lady Gaga—Super Bowl 2016"), and a temporal position related to playing of the media content. The second cast device 108-2 or the second electronic device 190-2 then receives a media display request including the instant play information from the cloud cast service server 116, and in accordance with the instant play information, executes the first media play application that controls the second output device 106-2 or the second electronic device 190-2 to play the media content from the temporal location.

Figure 3:
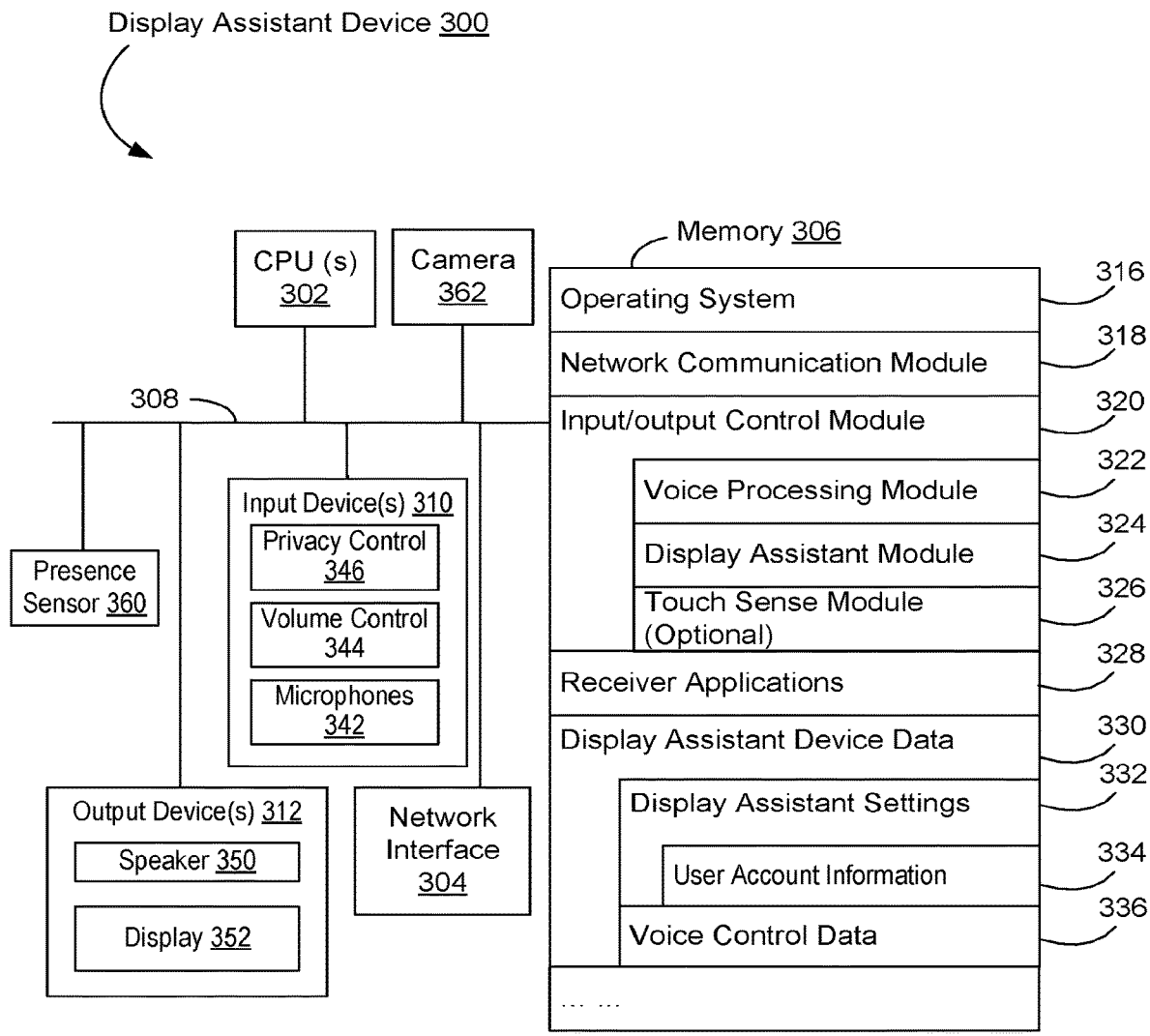
FIG. 3 is a block diagram illustrating an example display assistant device that is applied as a voice interface to collect user voice commands in a smart home environment in accordance with an embodiment of the present disclosure.

FIG. 3 is a block diagram illustrating an example display assistant device that is applied as a voice interface to collect user voice commands in a smart home environment 100 and/or display media content in accordance with some implementations. The display assistant device 300 typically includes one or more processing units (CPUs) 302, one or more network interfaces 304, memory 306, and one or more communication buses 308 for interconnecting these components (sometimes called a chipset). The display assistant device 300 includes one or more output devices 312, including one or more speakers 350 and a display 352. The display assistant device 300 also includes one or more input devices 310 that facilitate user input, including one or more microphones 342, a volume control 344 and a privacy control 346. The volume control 346 is configured to receive a user action (e.g., a press on a volume up button or a volume down button, a press on both volumes up and down buttons for an extended length of time) that controls a volume level of the speakers 350 or resets the display assistant device 300. The privacy control 346 is configured to receive a user action that controls privacy settings of the display assistant device (e.g., whether to deactivate the microphones 342). In some implementations, the input devices 310 of the display assistant device 300 include a touch detection module (not shown in FIG. 3) that is integrated on the display panel 352 and configured to detect touch inputs on its surface. In some implementations, the input devices 310 of the display assistant device 300 include a camera module configured to capture a video stream and/or a picture of a field of view. For instance, in some implementations a user instructs the display assistant device 300 to show photos of one or more objects (e.g., people and/or animals) that are in a field of view of the device. Accordingly, the display device 300 and/or an external server (e.g., content host 114 and/or voice/display assistance server 112) to detect the faces in the field of view. Content that is stored on the display device 300 and/or the content host 114 is analyzed to determined media content that includes the detected faces. This media content is then displayed on the requested device (e.g., a device the request originated from). Alternatively, in some implementations, the input devices 310 of the display assistant device 300 does not include any camera or touch detection module, because they relatively expensive and can compromise the goal of offering the display assistant device 300 as a low cost user interface solution.

In some implementations, the display assistant device 300 further includes a presence sensor 360 configured to detect a presence of a user in a predetermined area surrounding the display assistant device 300. Under some circumstances, the display assistant device 300 operates at a sleep or hibernation mode that deactivates detection and processing of audio inputs, and does not wake up from the sleep or hibernation mode or listen to the ambient (i.e., processing audio signals collected from the ambient) until the presence sensor 360 detects a presence of a user in the predetermined area. An example of the presence sensor 360 is an ultrasonic sensor configured to detect a presence of a user. For instance, in some implementations the display device 300 is configured to sleep or hibernate when a presence of a user is not detected to conserve energy consumption of the device.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

- Operating system 316 including procedures for handling various basic system services and for performing hardware dependent tasks;
- Network communication module 318 for connecting the display assistant device to other devices (e.g., the server system 140, the cast device 108, the client device 104, the smart home devices and the other voice-activated electronic device(s) 190) via one or more network interfaces 304 (wired or wireless) and one or more networks 110, such as the Internet, other wide area networks, local area networks, metropolitan area networks, and so on;
- Input/output (I/O) control module 320 for receiving inputs via one or more input devices 310 enabling presentation of information at the display assistant device via one or more output devices 312, including:
    - Voice processing module 322 for processing audio inputs or voice messages collected in an environment surrounding the display assistant device 300, or preparing the collected audio inputs or voice messages for processing at a voice/display assistance server 112 or a cloud cast service server 118;
    - Display assistant module 324 for displaying additional visual information including but not limited to a media content item (e.g., stock photos or videos), social media messages, weather information, personal pictures and/or videos, comments associated with the personal pictures and/or videos, a state of audio input processing, and readings of smart home devices as well as for processing media queries and determining subject matter of a media file; and
    - Touch sense module 326 for sensing touch events on a top surface of the display assistant device 300; and
- One or more receiver application 328 for responding to user commands extracted from audio inputs or voice messages collected in an environment surrounding the display assistant device 300, including but not limited to, a media play application, an Internet search application, a social network application and a smart device application;
- Display assistant device data 330 storing at least data associated with the display assistant device 300, including:
    - Display assistant settings 332 for storing information associated with the display assistant device 300 itself, including common device settings (e.g., service tier, device model, storage capacity, processing capabilities, communication capabilities, user settings, etc.) and information of a user account 334 in a virtual user domain to which the display assistant device is linked; and Voice control data 336 for storing audio signals, voice messages, response messages and other data related to voice interface functions of the display assistant device 300.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules are combined or otherwise re-arranged in various implementations. In some implementations, memory 306, optionally, stores a subset of the modules and data structures identified above. Furthermore, memory 306, optionally, stores additional modules and data structures not described above.

Figure 4:
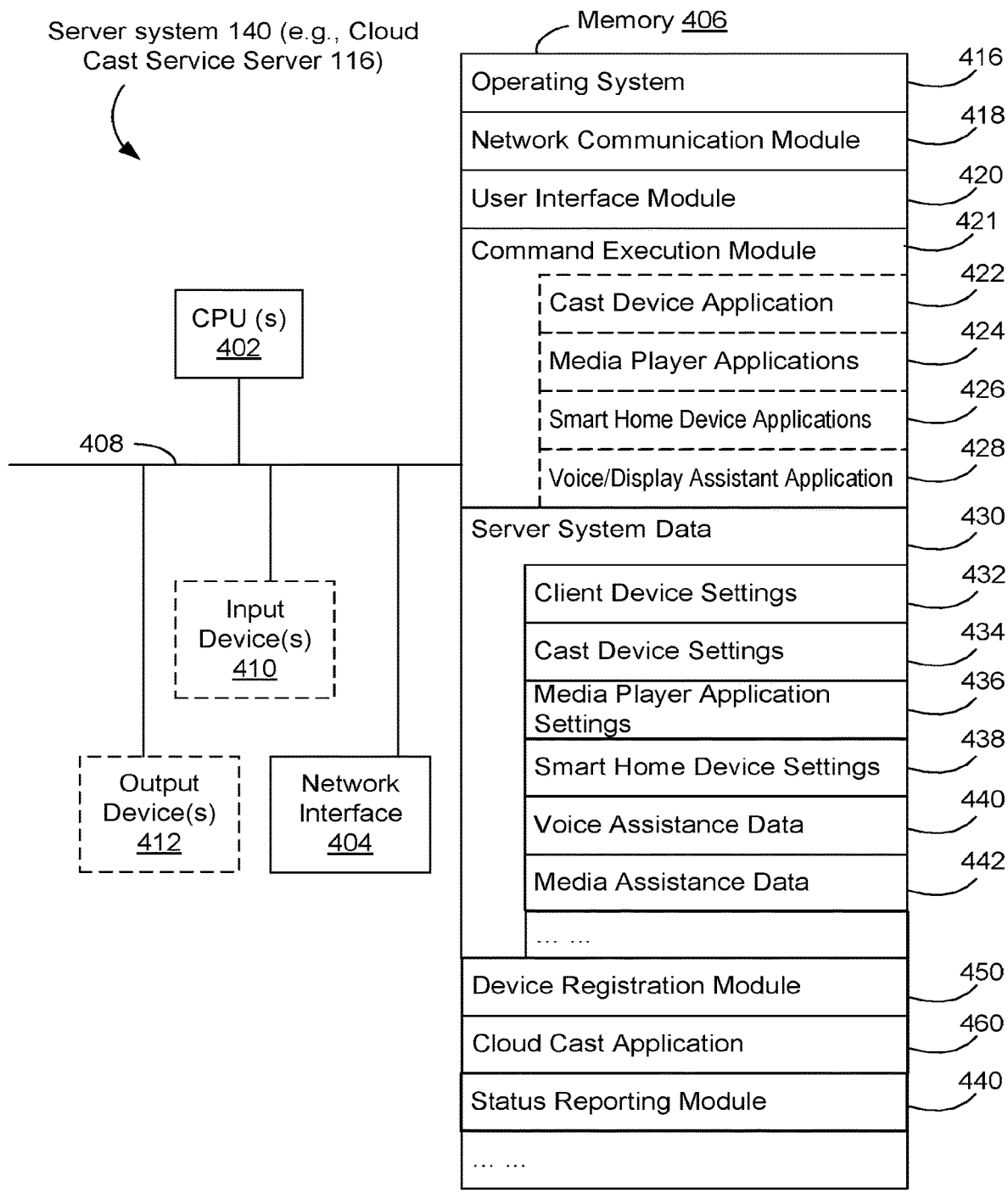
FIG. 4 is a block diagram illustrating an example server in the server system 140 of a smart home environment in accordance with an embodiment of the present disclosure.

FIG. 4 is a block diagram illustrating an example server in the server system 140 of a smart home environment 100 in accordance with some implementations. An example server is one of a cloud cast service sever 116. The server system 140, typically, includes one or more processing units (CPUs) 402, one or more network interfaces 404, memory 406, and one or more communication buses 408 for interconnecting these components (sometimes called a chipset). The server system 140 could include one or more input devices 410 that facilitate user input, such as a keyboard, a mouse, a voice-command input unit or microphone, a touch screen display, a touch-sensitive input pad, a gesture capturing camera, or other input buttons or controls. Furthermore, the server system 140 could use a microphone and voice recognition or a camera and gesture recognition to supplement or replace the keyboard. In some implementations, the server system 140 includes one or more cameras, scanners, or photo sensor units for capturing images, for example, of graphic series codes printed on the electronic devices. The server system 140 could also include one or more output devices that enable presentation of user interfaces and display content, including one or more speakers and/or one or more visual displays.

Memory 406 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 406, optionally, includes one or more storage devices remotely located from one or more processing units 402. Memory 406, or alternatively the non-volatile memory within memory 406, includes a non-transitory computer readable storage medium. In some implementations, memory 406, or the non-transitory computer readable storage medium of memory 406, stores the following programs, modules, and data structures, or a subset or superset thereof:

Operating system 416 including procedures for handling various basic system services and for performing hardware dependent tasks;

Network communication module 418 for connecting the server system 140 to other devices (e.g., various servers in the server system 140, the client device 104, the cast device 108, and the smart home devices 120) via one or more network interfaces 404 (wired or wireless) and one or more networks 110, such as the Internet, other wide area networks, local area networks, metropolitan area networks, and so on;

User interface module 420 for enabling presentation of information (e.g., a graphical user interface for presenting applications, widgets, websites and web pages thereof, and/or games, audio and/or video content, text, etc.) at the client device 104;

Command execution module 421 for execution on the server side (e.g., games, social network applications, smart home applications, and/or other web or non-web based applications for controlling the client device 104, the cast devices 108, the voice activated electronic device 190 (e.g., a display assistant device 300) and the smart home devices 120 and reviewing data captured by such devices), including one or more of:

a cast device application 422 that is executed to provide server-side functionalities for device provisioning, device control, and user account management associated with cast device(s) 108;

one or more media player applications 424 that is executed to provide server-side functionalities for media display and user account management associated with corresponding media sources (e.g., content host 114 of FIG. 1);

one or more smart home device applications 426 that is executed to provide server-side functionalities for device provisioning, device control, data processing and data review of corresponding smart home devices 120; and a voice/display assistant application 428 that is executed to arrange voice processing of a voice message received from a voice-activated electronic device 190, directly process the voice message to extract a user voice command and a designation of a cast device 108 or another voice-activated electronic device 190, and/or enable a voice-activated electronic device 190 to play media content (audio or video); and Server system data 430 storing at least data associated with automatic control of media display (e.g., in an automatic media output mode and a follow-up mode), including one or more of:

Client device settings 432 for storing information associated with the client device 104, including common device settings (e.g., service tier, device model, storage capacity, processing capabilities, communication capabilities, user settings, etc.), and information for automatic media display control;

Cast device settings 434 for storing information associated with user accounts of the cast device application 422, including one or more of account access information, information for device settings (e.g., service tier, device model, storage capacity, processing capabilities, communication capabilities, etc.), and information for automatic media display control;

Media player application settings 436 for storing information associated with user accounts of one or more media player applications 424, including one or more of account access information, user preferences of media content types, review history data, and information for automatic media display control;

Smart home device settings 438 for storing information associated with user accounts of the smart home applications 426, including one or more of account access information, information for one or more smart home devices 120 (e.g., service tier, device model, storage capacity, processing capabilities, communication capabilities, etc.);

Voice assistance data 440 for storing information associated with user accounts of the voice/display assistant application 428, including one or more of account access information, information for one or more display assistant devices 190 (e.g., service tier, device model, storage capacity, processing capabilities, communication capabilities, etc.); and Media assistance data 442 for storing information associated with each media file as well as processing of the media files in order to determine a subject matter of the media files.

When the server system 140 includes a cloud cast service server 116, memory 406, or the non-transitory computer readable storage medium of memory 406, stores the following programs, modules, and data structures, or a subset or superset thereof:

Device registration module 450 for managing the device registry 118 coupled to the cloud cast service server 116;

Cloud cast application 460 for relaying a user voice command identified in a voice message to one or more of the cast device(s) 180, the electronic device(s) 190 and the smart home device(s) 120 that are coupled in a cloud cast user domain; and Status reporting module 470 for maintaining the states of the cast device(s) 180, the electronic device(s) 190 and the smart home device(s) 120 that are coupled in a cloud cast user domain.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 406, optionally, stores a subset of the modules and data structures identified above. Furthermore, memory 406, optionally, stores additional modules and data structures not described above.

FIGS. 5A-5E are a perspective view, a front view, a rear view, a side view, a top view and a bottom view of a display assistant device 500 in accordance with some implementations, respectively. The display assistant device 500 includes a base 502 and a screen 504. The base 502 is configured for sitting on a surface. The screen 504 has a rear surface 506 at which the screen 504 is supported by the base.

The base 502 acts a speaker box. A speaker is concealed inside the base and configured to project sound substantially towards the front view of the display assistant device.

In some implementations, a bezel area includes one or more microphone holes 512. One or more microphones 342 are placed behind the microphone holes 512 and configured to collect sound from the ambient of the display assistant device 500. In some implements, the display assistant device 500 further includes a camera opening 520 that holds a camera (e.g., camera 362 of FIG. 3) configured to capture a field of view of the device. For instance, in some implementations, media content that is displayed on the device includes subject matter that was captured by the camera of the device. In some implementations, the camera is configured to detect a light condition in the smart home environment 100 where the display assistant device 500 sits. In some implementations, the display assistant device 500 is configure to adjust a brightness level of its screen 504 according to the light condition. The camera is disposed behind the bezel area and exposed to light via a transparent part of the bezel area, e.g., the sensor opening 520.

Figure 5A:
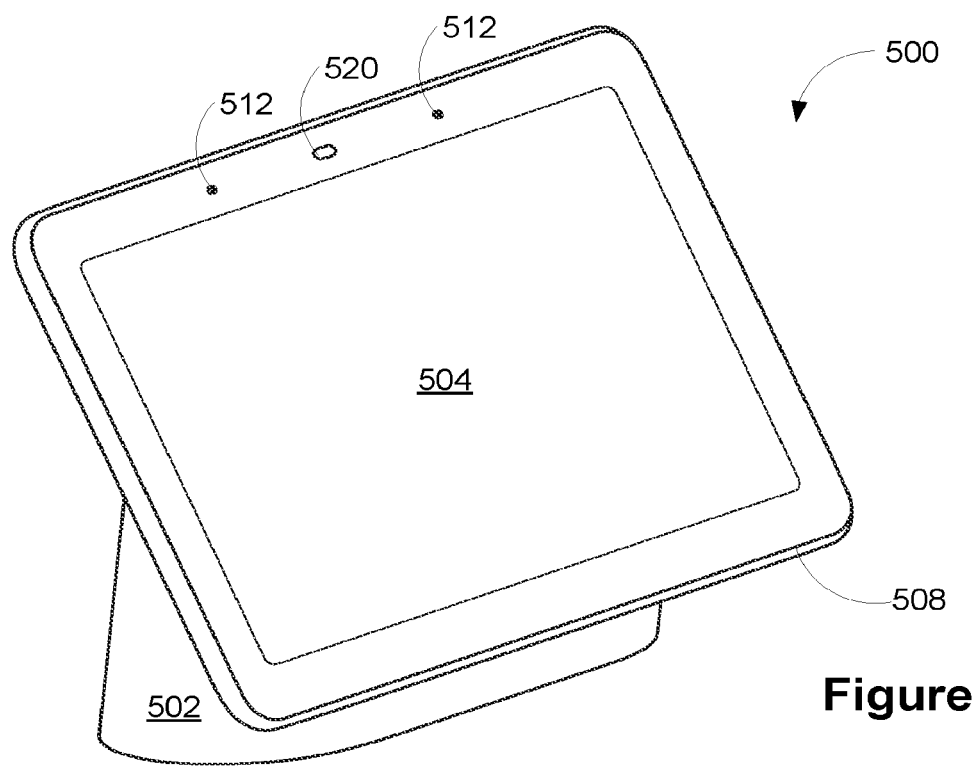
FIGS. 5A, 5B, 5C, 5D, 5E, and 5F are a perspective view, a front view, a rear view, a side view, a top view and a bottom view of a display assistant device in accordance with an embodiment of the present disclosure.
Figure 5B:
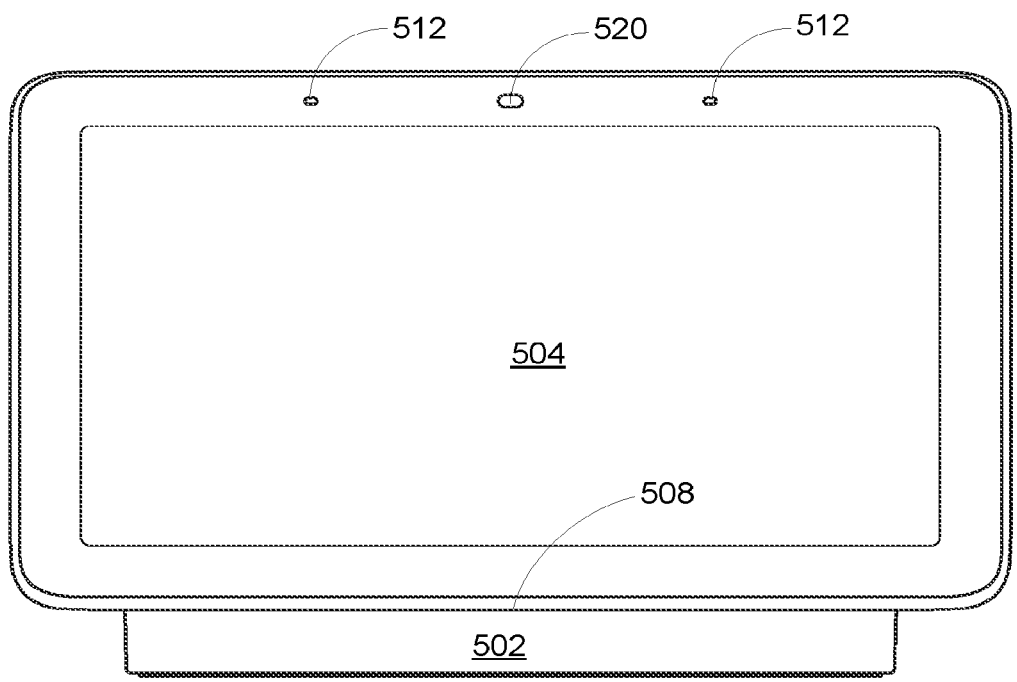
Figure 5C:
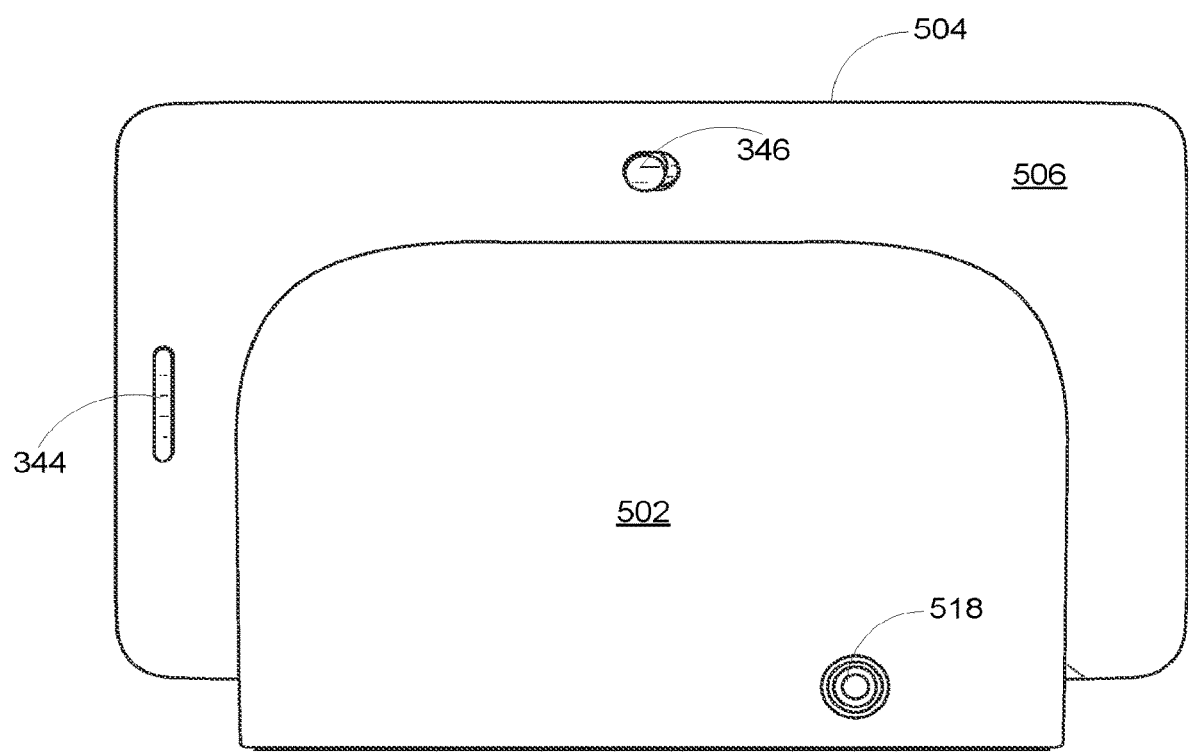
Figure 5D:
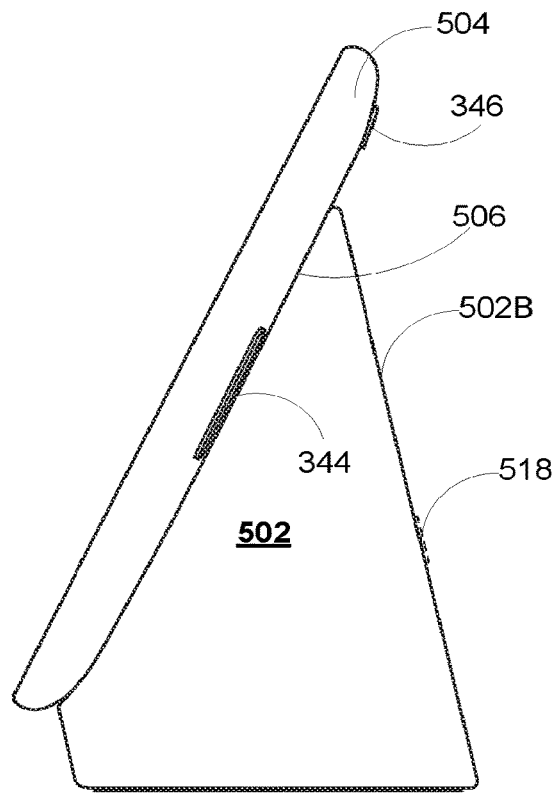
Figure 5E:
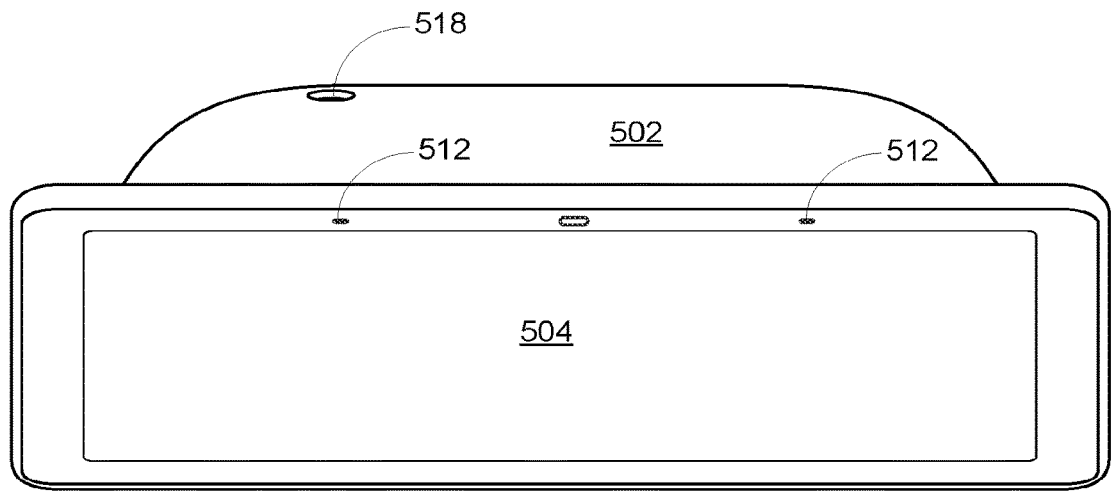
Figure 5F:
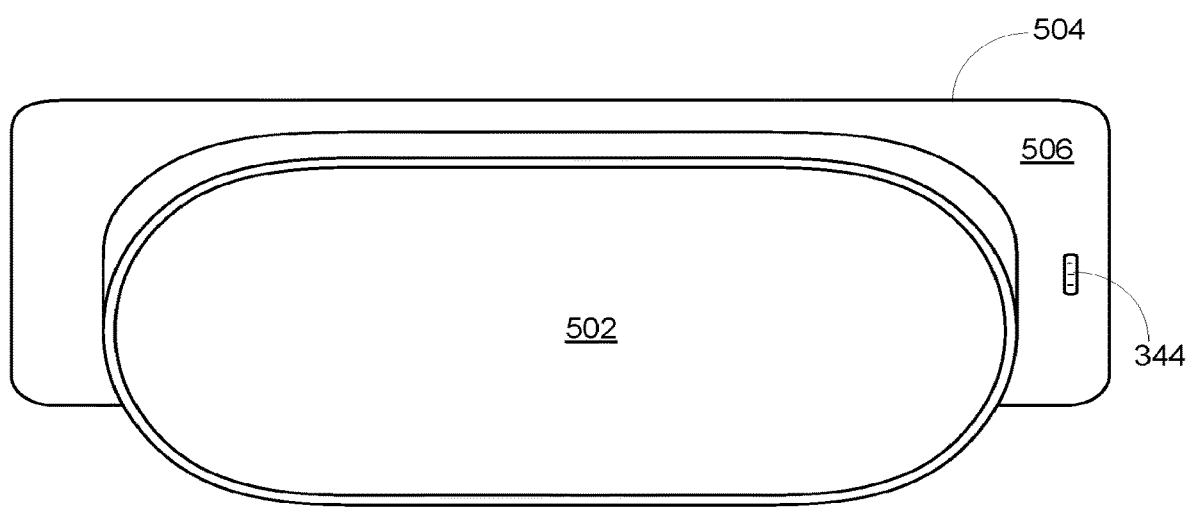

Referring to FIG. 5C, the display assistant device 500 further includes a volume control 344, a privacy control 346 and a power adaptor interface 518. In this example, the volume control button 514 and privacy control 346 are disposed on the rear surface 506 of the screen 504, and the power adaptor interface 518 is disposed on the rear surface 502B of the base 502. However, the present disclosure is not limited thereto.

In this implementation, the power adaptor interface 518 of the display assistant device 500 is disposed on the rear surface 502B of the base 502. The power adaptor interface 518 includes a male connector to receive a female connector configured to connect the display assistant device 500 to an external power source (e.g., a direct current power source). In some implementations, the display assistant device 500 has to be constantly connected to an external power source, and is powered off when the external power source is disconnected. Alternatively, in some implementations, the power management unit includes a rechargeable battery. The rechargeable battery is configured to be charged with the external power source, and drive the display assistant device 500 temporarily when the external power source is disconnected from the display assistant device 500.

It is noted that FIGS. 5A-5D are focused on an overall look and mechanical features of the display assistant device 500. More details on functions of the display assistant device 500 are described above with reference to FIGS. 1-4.

In some embodiments, media files are displayed using display settings (e.g., brightness, color intensity, etc.) based, at least on part, on a perceived location of a user relative to the local device. In some embodiments the local device determined the location of a user by a method comprising while audibly communicating with a user via the speaker and microphone, sending one or more ultrasound pulses via the speaker, receiving, via the microphone, one or more signals corresponding to the one or more ultrasound pulses, and determining positioning of the user based on the one or more received signals a further disclosed in International Patent Application Number PCT/US18/4870, entitled "Systems and Methods of Ultrasonic Sensing in Smart Devices," filed Aug. 30, 2018, and U.S. Provisional Patent Application No. 62/680,982, entitled "Systems and Methods of Ultrasonic Sensing in Smart Devices," filed Jun. 5, 2018, each of which is hereby incorporated by reference. For example, in some embodiments, when the perceived location of the user is further away from the device, the media files are displayed more brightly or with different color intensity than when the user is closer to the device. In other embodiments, when the perceived location of the user is further away from the device, the media files are displayed less brightly or with different color intensity than when the user is closer to the device. In still other embodiments, this perceived distance is used to calibrate and/or interpret voice commands received from the user and/or to determine an audio level to use in communicating with the user.

Figure 6D:
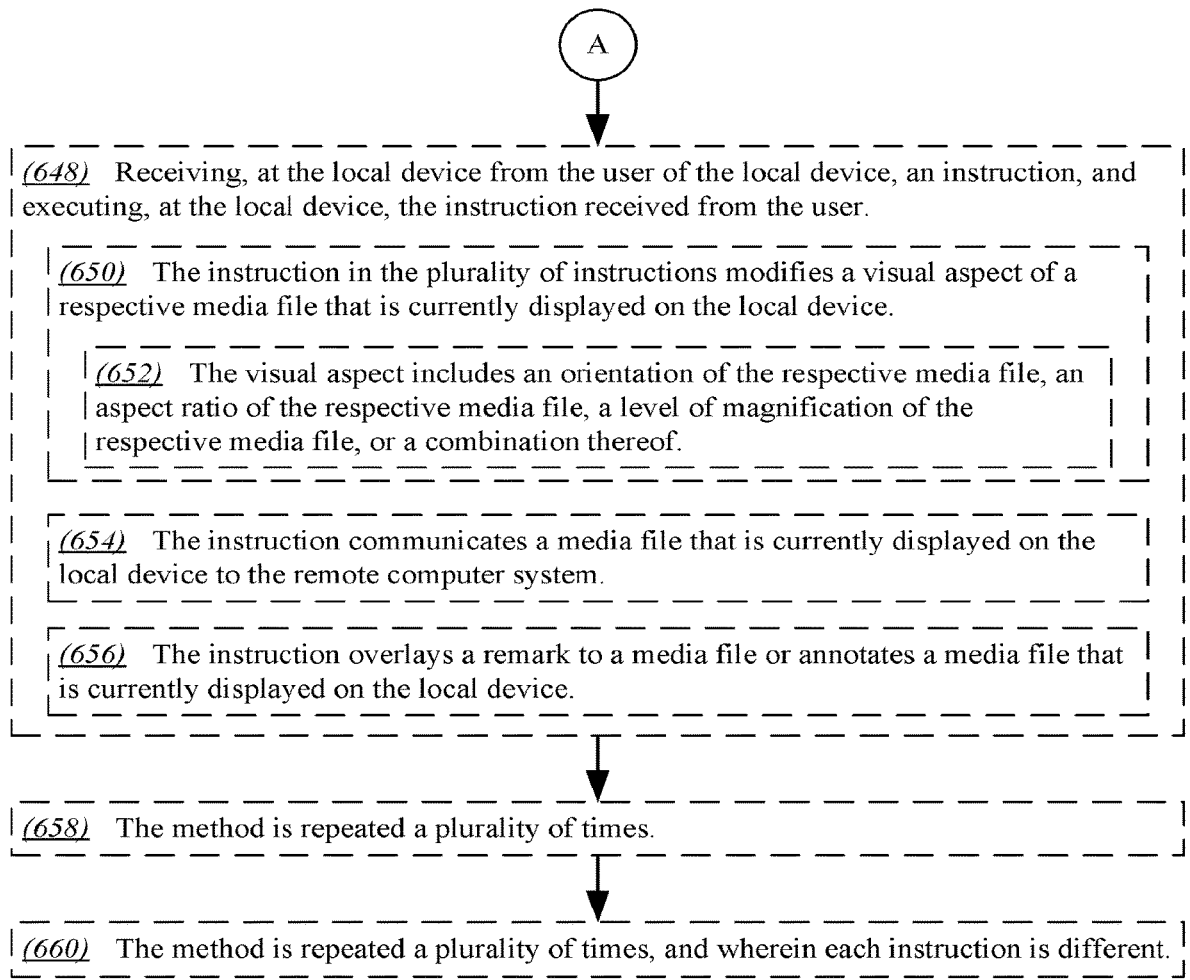

FIG. 6 is a flow chart of a method 600 for displaying media files at a device (e.g., display assistant device 300 of FIG. 3), in accordance with some implementations of the present disclosure. The method 600 is performed at a device, such as display assistant device 190 of FIG. 1. For example, instructions for performing the method 600 are stored in the memory 306 and executed by the processor(s) 302 of display assistant device 300. In some implementations, one or more operations described with regard to method 600 are performed by server system 140 and/or display assistant device 300. For example, instructions for performing the method 600 are stored in the memory and executed by the processor(s) 402 of the server system 140.

Block 602. Referring to block 602 of FIG. 6A, a local device (e.g., a display assistant device) includes one or more processors (e.g., CPU 302 of FIG. 3), memory (e.g., Memory 306 of FIG. 3) storing one or more programs (e.g., network communication module 318, I/O control module 320, receiver applications 328, display assistant module 324, etc.) for execution by the one or more processors, a display (e.g., display 352 of FIG. 3), and a communication interface (e.g., network interface 304 of FIG. 3) in electrical communication with a remote computer system (e.g., content host and/or voice/display assistance server 112 of FIG. 1). The one or more programs singularly or collectively use the one or more processors to execute the methods of the present disclosure.

Block 604. Referring to block 604, the one or more programs include providing different modes of the local device. These modes of the display assistant device include a first mode that is configured to display a subset of media files in a plurality of media files (e.g., a selection from one or more collections of media files stored in a database and/or provided by the content hosts 114 of FIG. 1). These media files include digital image files storing various media content (e.g., .gif, .jpeg, .pdf, .png, etc.) and/or digital video files storing various media content (e.g., .avi, .mkv, .mp4, etc.). In some implementations, the subset of media files is determined by at least a user query (e.g., a voice request of "OK Google, Show Dali paintings" determines a subset of media files associated with the painter Salvador Dali from a larger collection of files). In some implementations, the first mode persists on the local device for a predetermined period of time prior to becoming inactive. This allows for the first mode to be an active mode (e.g., is engaged by being activated). For instance, in some implementations the user includes a request to display media content for a particular time. Moreover, in some implementations the first mode persists indefinitely until interruption of the display assistant device) occurs (e.g., a high priority notification) and/or a user query or instruction instructs the local device to deactivate the first mode or enter a new instance of the first mode. However, the present disclosure is not limited thereto as will be described in further portions of the present disclosure.

The modes of the display assistant device also include a second mode that is configured to display the plurality of media files. The second mode is active on the local device in accordance with a determination that the first mode is inactive on the local device. This allows for the second mode to be a passive (e.g., ambient) mode, since it is activity is dependent on the first mode. For instance, in some implementations the second mode is an ambient mode that is configured to display all media files that are accessible to the local device. In some embodiments, the user of the device applies a setting that omits particular media files (e.g., media files with a specific subject matter).

In some embodiments, the interplay between the first mode and other modes such as the second mode or other modes is facilitated by collecting usage information and thereby identifying usage patterns of the user. In such embodiments, usage information of the local device by the user is collected, and a usage pattern of the device based on the collected usage information is determined. A correlation factor of the usage pattern for the user is further elucidated, where the correlation factor includes a state of a plurality of states of the first user including an activity of the first user and a location of the first user within a premise housing the local device, where the correlation factor indicates a degree to which uses of the local device are correlated with the state of the first user. Then, in accordance with the determination of the correlation factor of the usage pattern for the first user, there is generated, for the user, an operational profile for operating the local device and the local device is operated in accordance with the operational profile for the first user. This operational profile may include, for example, how long to the first mode is to last, display settings, how long each media file is to be displayed, which media files to display and the like. The determination of such usage patterns and correlation factors is disclosed in U.S. Pat. No. 10,088,818, entitled "Systems and Methods for Programming and Controlling Devices with Sensor Data and Learning," which is hereby incorporated by reference.

In some implementations, the modes include a third mode that places the device in a disabled state. For instance, in some implementations the third mode turns the display off or turns a brightness of the display at 0% or a near zero value such as 1% or 5%. Furthermore, in some implementations the modes include a fourth mode that places the device in a default, or home, state. For instance, in some implementations the fourth mode stops displaying media content and returns to a home screen of the display assistant device.

Block 606. Referring to block 606, in some implementations the media files that are accessible to the device include one or more media files that is publically accessible on the Internet. For instance, in some implementations the device accesses a database (e.g., accessible to a cloud storage server, content host 114 of FIG. 1, etc.) that includes a collection of stock images (e.g., artwork) that are displayed on the device. However, the present disclosure is not limited thereto. In some implementations, one or more of these media files is stored on the local device.

Block 608. Referring to block 608, in some implementations the media files that are accessible to the device includes two or more media files that are associated with any one of the users of the local device. From these files, two or more media files are associated with at least one user from the users. Moreover, at least one media file in the plurality of media files is associated with a first user of the local device. Further, at least one media file in the plurality of media files is associated with a second user of the local device. In other words, in some implementations the local device accesses media files that are associated with each user of the device and/or a subset of the users of the device. Accordingly, in some embodiments, each user accesses photos that are associated with the respective user, as well as all or a selection of photos associated with different users of the display assistant device.

Blocks 610 through 616. Referring to block 610, in some implementations the plurality of media files includes each media file that is accessible to the display assistant device. According, each media file must have a score value that satisfies a threshold score value. For instance, a large collection of media files may be accessible to the device (e.g., stored on the local device, accessible from the content host 114, etc.), and only media files that satisfy the threshold score value are included in the plurality of media files that is accessible for display on the display assistant device. In some embodiments, a score value is independently associated with each media file by the local device, by the content hosts 114, or another external server. Referring to block 612, in some implementations the threshold score value is a media file creation date or a time relative to when the instruction was received by the local device. For instance, in some implementations the plurality of media files includes media files with a creation date that satisfies a threshold date (e.g., only media files created in the past year). This allows the local device to only display the most recent media files, which prevents the device from being stale to a user. Referring to block 614 of FIG. 6B, in some implementations the score value of a media file having any condition in an enumerated set of conditions, or combination thereof, is down-weighted. This down-weight prevents these media files from being included in the plurality of media files accessible for display on the device. Referring to block 616, in some implementations the enumerated set of conditions includes being out of focus, including handwriting (e.g., photos of a whiteboard or classroom notes, grocery lists, etc.), being a printed document (e.g., scans of documents, photos of receipts, etc.), being adult material (e.g., pornographic material, etc.), and/or predetermined subject matter that is defined by the user of the local device (e.g., nude baby pictures, omitting pictures of cats, etc.). One skilled in the art knows of other conditions that would prevent a media file from being included in the plurality of media files. This allows for the local device to moderation and prevent unwanted content from being displayed, while also provided the best content to the user.

Block 618. Referring to block 618, in some implementations the predetermined period of time with which the first mode persists on the local device is determined by a setting of the local device. For instance, in some implementations a setting of the device is configured to limit the first mode using a timeout setting, which disables the display assistant device (e.g., places the device in sleep or hibernation) or displays media content until a particular period of time is satisfied.

Blocks 620 through 624. Referring to block 620, in some implementations the one or more programs include receiving an instruction from a user of the local device. Referring to block 622, in some implementations the instruction includes a request to display the subset of media files for a predetermined period of time. Furthermore, in some embodiments the instruction includes a request to display the subset of media files indefinitely (e.g., until a user instruction instructs otherwise). Referring to block 624, in some implementations the instruction is communicated by the user of the local device through a microphone of the local device (e.g., microphones 342 of FIG. 3). Additionally, in some embodiments, the instruction is communicated by the user of the local device through a touch display of the local device in some implementations.

Block 626. Referring to block 626, in some implementations when the instruction includes a user query in the instruction, the first mode is specified. Responsive to the user query, the subset of media files in the plurality of media files is polled for from the remote computer system across the communication interface. For instance, a user query of "Play photos from last Christmas," determines the subset of media files to include subject matter of "last Christmas," which is then polled for from a larger collection of media files (e.g., a collection of photos associated with a user). Each respective media file in the subset of media files is sequentially displayed on the display of the local device in accordance with the first mode. However, the present disclosure is not limited thereto. For instance, in some implementations two or or more media files in the subset of media files are sequentially displayed on the display of the device (e.g., a series of split screen images are sequentially displayed on the local device). The sequential displaying of each media file in the subset of media files is repeated until the predetermined period of time has elapsed. Furthermore, when the instruction does not specify a user query, the plurality of media files is polled for from a device that is remote from the local device. Accordingly, each media file in the plurality of media files is sequentially displayed in accordance with the second mode.

Block 628. Referring to block 628, in some implementation the user query is a request to display publically accessible files. For instance, in some embodiments, when a user does not want personal media content to be displayed on the device, the user requests the local device to display generic media content. In some implementations, the request to display publically accessible files is a sub-mode of the first mode (e.g., "OK Google, enter privacy mode,").

Block 630. Referring to block 630, in some implementations the user query is a request to display a predetermined subset of media files in the plurality of media files. For instance, in some embodiments, when the user or other content provider has pre-curated a selection of media files (e.g., a photo album), the user requests the particular pre-curated selection of media files to be displayed. In some implementations, one or more rules are applied to the predetermined subset of media files. Accordingly, if a new media file is added to the plurality of media files and the media file satisfies the one or more rules of the predetermined subset of media files, this media file is added to the subset of media files (e.g., a live album of media content that automatically incorporates new and relevant media content associated with the user). In some embodiments, these rules require that each media file in the predetermined subset of media files be associated with a same location (e.g., as determined by metadata of the media files), be associated with a type of media content (e.g., includes only selfies, include only animations and/or videos, etc.). In some implementations, the rules incorporate one or more user queries to create a predetermined subset of media files. For instance, a user query of "Show Baseball pictures," may lead the local device to create a predetermined subset of media files associated with "Baseball pictures."

Blocks 632 through 636. Referring to block 632 of FIG. 6C, in some implementations, the user query is a request to display media files in the plurality of media files that include specified subject matter. In some implementations, the media files that are accessible to the device from the user query are media files that are associated with each user of the device. For instance, a user query for "Show pictures of the beach," will display media files that are associated with the user and the beach as a subject. Furthermore, in some implementations the media files that are accessible to the local device from the user query are media files that are associated with the particular user that gave the query. For instance, in some embodiments two or more users are associated with the local device and restrict access to their respective associated media files from other users, such as restricting access to all users and/or restricting access to a subset of users (e.g., blocking users). In some implementations, this restriction is applied to subsets of media files associated with each user (e.g., a user restricting access to photos of a prototype invention to other users of the device). Referring to block 634, in some implementations the specified subject matter is communicated by a user of the local device. For instance, in some embodiments, the specified subject matter is included in the user query, which is a general query for a particular subject matter (e.g., a user query of "OK Google, Show me pictures of babies,"). In some implementations, the specified subject matter is a location, such as a country, a state, a county, a city, etc., which, in some embodiments, is determined by metadata associated with each media file. In some implementations, the specified subject matter is a time, such as media files that were created and/or associated with a particular period of time. In some embodiments, this time is a seasonal period (e.g., media files associated with winter), a recent period of time (e.g., media files created in or associated with a previous month), or a combination thereof. For instance, in some implementations media files that are associated with a current time but created at a later date are displayed (e.g., if today is January 1st, than photos from January 1st taken during previous years are displayed). This allows for the user of the local device to re-visit previous memories that are associated with a particular time. In some implementations, the specified subject matter is a face or identity of a person or animal. For instance, in some embodiments each media file is analyzed to determine if a person or animal is included in the subject matter of the media file (e.g., determined through facial recognition systems and methods). In some implementations, the specified subject matter is a color of a media file. For instance, in some embodiments, when a respective media file is associated with a particular color and/or palate of colors (e.g., a major portion of a media file is red or includes colors associated with Autumn), the user requests additional media files to be displayed that are also associated with this color (e.g., a user query of "OK Google, Show me photos that are primarily green). Furthermore, in some implementations the specified subject matter is an artistic style that is associated with respective media files. Example non-limiting artistic styles include types of media content such as selfies, portraits, landscape and/or scenery. Additionally, in some embodiments, the artistic styles further include particular movements of art such as cubism, realism, modern, renaissance, water color, digital art, etc. Furthermore, in some implementations the specific subject matter includes a combination of the above described subject matters (e.g., a user query of "OK Google, Show me abstract art that is primarily black in color.").

Blocks 638 and 640. Referring to block 638, in some implementations the specified subject matter is a subject matter that is captured by a camera of the local device (e.g., camera 520 of FIG. 5). For instance, in some embodiments a user query requests media content to be displayed on the local device that includes people and/or animals that are in a field of view of the device (e.g., a user query of "OK Google, Show pictures of the three of us,"). In some implementations, the camera of the device is off (e.g., deactivated) and will turn on (e.g., activate) upon receiving such a request thereby conserving energy consumption. Referring to block 640, in some implementations the subject matter that is captured by the camera of the local device is determined by a remote computer system (e.g., voice/display assistance server 112 and/or content host 114). However, the present disclosure is not limited thereto as the subject matter that is captured by the camera of the local device is determined by the local device in some implementations.

Block 642 and 644. Referring to block 642, in some implementations the sequentially displaying of the media files collectively displays the media files for the predetermined period of time by successively displaying each respective media file for a portion of the predetermined period of time. For instance, if the media files, which are collectively displayed, includes ten files and the predetermined period of time is determined to be fifty minutes, then each file is displayed for five minutes. In other words, each media file that in a set of media files to be displayed on the device receives an equal amount of display time. Referring to block 644, in some implementations the predetermined period of time is determined according to a number of media files in the media files as determined by the active mode of the local device. For instance, in some embodiments, the local device determines that each media file should be displayed for a particular period of time (e.g., one minute). Accordingly, if the media files as determined by the active mode of the local device includes a number of files, this number is multiplied by the particular period of time to determine (e.g., the media files include a hundred files, thus the total display time is one hundred minutes). In other words, if a period of time is not specified by a user, the local device will display the media files for a default predetermined period of time.

Block 646. Referring to block 646, in some implementations the one or more programs include receiving from the remote computer system (e.g., smart server system 140 of FIG. 1) one or more media files in the subset of media files that is accessible to the remote computer system. These media files are received in response to the instruction and without human interaction. This allows the local device to access a large collection of media files that would otherwise require the device to include an equally large storage medium should the media files be stored locally instead.

Block 648 through 656. Referring to block 648 of FIG. 6D, in some implementations the one or more programs further includes instructions for receiving, at the local device from the user of the local device, an instruction (e.g., a command), and executing, at the local device, the instruction received from the user. For instance, similar to the above described queries and instructions for particular media files, in some implementations the instructions are actionable events or tasks associated with a respective media file and/or the local device. Referring to block 650, in some implementations the instruction modifies a visual aspect of a respective media file that is currently displayed on the local device. In some implementations, the visual aspect includes an orientation of the respective media file, such as an instruction to modify an orientation of a photo from portrait to landscape. In some implementations, the visual aspect includes an aspect ratio of the respective media file, such as an instruction to modify an aspect ratio from letterbox to full screen. In some implementations, the visual aspect includes a level of magnification of the respective media file, such as an instruction to upscale or downscale a respective media file. In some implementations, the user instructs the device to magnify a portion of a respective media file, such as an instruction to magnify portions of the respective media file that include relevant subject matter (e.g., a user instruction of "Ok Google, zoom in on our faces,"). Furthermore, in some embodiments, these instructions are provided through the touch display of the local device (e.g., display 352 of FIG. 3), such as a pinch movement to magnify a portion of the media file. These modifications to the do not permanently alter the respective media file, unless expressly instructed to by the user, such as an instruction to save a modified media file. In some embodiments, this modified media file is written over the previous media file, or saved as a new media file.

Referring to block 654, in some implementations the instruction communicates a media file that is currently displayed on the local device to the remote computer system. For instance, and as previously described, in some embodiments the user instructs the local device to display media content on another device. For instance, in some embodiments, the user instructs the local device to display current media content on every device that is in communication with the local device (e.g., media output devices and/or other local devices 190 of FIG. 1), such as instruction of "OK Google, Show me pictures of Caroline on all screens." Furthermore, in some implementations the instruction communicates a media file that is currently displayed on the local device to another local device that is associated with another user. For instance, in some embodiments, the user instruct their associated local device to share a current media file or content with a friend (e.g., a user instruction of "OK Google, Share this album with Sarah,"). In some embodiments, the friend of the user is a contact associated with the user, or is proximate to a local device associated with a user (e.g., in order to share via a local network.)

Referring to block 656, in some implementations the instruction overlays a remark (e.g., likes 708 of FIGS. 7B) to a media file. Moreover, in some implementations the instruction annotates a media file that is currently displayed on the local device. For instance, in some embodiments a user instructs the local device to add a comment (e.g., comments 710 of FIG. 7B) to a media file (e.g., a user instruction of "OK Google, Like this photo."). This comment is accessible to all users associated with the commented media file. In a specific example, a media file is shared with a user by a contact associated with the local user (e.g. a remote user). In some embodiments, the local user then comments on the media file, which can then be accessed by the contact that shred the media file. In some implementations, a notification is displayed on the local device indicating that the media file was remarked or commented on. Further, in some implementations the remark provided by the user indicates a particular media file is a favorite media file. For instance, in some embodiments a subset of media files includes media files that have been marked as favorites. In some embodiments, the user also instructs the device to annotate various information related to a media file that is currently being displayed and/or previously displayed. This information includes a date associated with the media file (e.g., a date of creation, a date of association, etc.), a location associated with the media file (e.g., a location of creation of the media file, a subject matter location of the media file), a subject matter of the media file (e.g., the device provides information regarding what people are included or associated with a media file), and/or other information such as ownership and/or copyright information related to a media file. Moreover, in some implementations the comment that the user provided is reiterated back to the user through text-to-speech capabilities of the local device. In some embodiments, these comments and remarks are provided by the user through a voice input (e.g., "OK Google, heart this picture.") and/or provided by touch input (e.g., the user tapping a heart icon to remark the user likes the media file). In some implementations, overlaying a remark or annotation on a media file is a two-part instruction. A first part instructs the device to overlay the remark and/or annotation (e.g., a user instruction of "OK Google, add a comment on this photo."), while a second part provides the particular comment (e.g., a user instruction of "That picture is adorable."). In some implementations, the first part and the second part are interrupted by the local device in response to receiving the first part of the instruction. For instance, in some embodiments, after instructing the device to overlay a remark and/or annotation, the device instructs the user to proceed with providing the remark and/or annotation (e.g., a notification or text-to-speech that states "Sure, go ahead and say your comment.")

In some implementations, the user provides an instruction associated a media file with a predetermined subset of media files (e.g., a user instruction of "OK Google, add this photo to the Birthday album."). Similarly, in some embodiments the user also provides an instruction to create a new predetermined subset of media files that includes the current media file being displayed (e.g., a user instruction of "OK Google, create a new album called "Cats in Costumes" and include this image."). Likewise, in some embodiments the user also provides an instruction to remove a media file from a predetermined subset of media files (e.g., a user instruction of "OK Google, remove this photo from the album.").

Additionally, in some implementations the user provides an instruction to adjust an order of displaying of the media files. For instance, in some embodiments the user provides an instruction to the device to skip a current media file or to go back to a previously displayed media file. As described above, in some embodiments these instructions are provided orally by the user (e.g., a user instruction of "OK Google, next photo.") or provided through the touch display of the device (e.g., a swipe to advance to a next media file or revert to a previous media file).

In some implementations, all users are enabled to provide instructions and/or queries to the device. For instance, a guest of a user can provide the device a user query. In some embodiments, all users are enabled to provide a subset instructions and/or queries to the device. This subset of instructions limits guests of a user from sharing or commenting on media files that the user does not desire.

Blocks 658 and 660. Referring to block 658, in some implementations the above describes methods (e.g., one or more programs) are repeated a plurality of times or indefinitely (e.g., repeated until the device is turned off). Accordingly, referring to block 660, each repetition of the method includes a different instruction. This allows for the local device to poll for new media content and incorporate the new content for display. This also allows for the local device to readily response to user queries and/or instructions, as well as switching between the different modes of the device (e.g., transitioning from a first mode to a second mode).

Figure 7A:
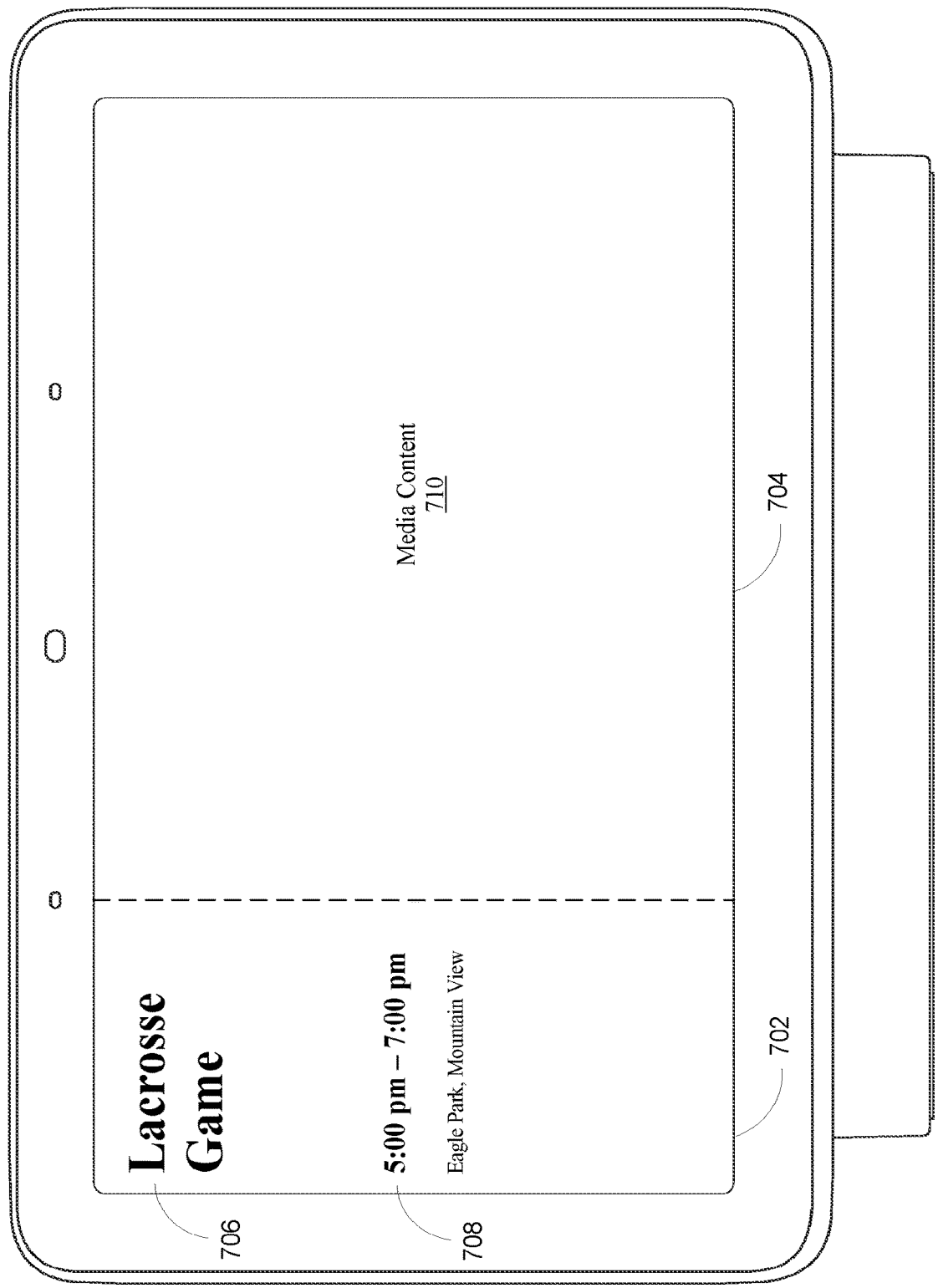
FIGS. 7A and 7B are user interfaces of a display assistant device in accordance with an embodiment of the present disclosure.

Referring to FIG. 7, various user interfaces of the display assistance device 700 are illustrated according to some implementations of the present disclosure. Specifically, FIG. 7A illustrates an implementation of a calendar event that is displayed on the local device. The calendar event is proportioned into a first region 702 that provides information related (e.g., information 706 and 708) to the event, and a second region 704 that provides media content associated with the event. This information includes a title 706 of the event, or similarly a day of the calendar), as well as location and/or time details 708 of the event. In some embodiments this information also includes expected attendees of the event.

In some implementations, the media content 710 that is displayed in the second region 704 can be either selected by the user or automatically curated by the systems and methods of the present disclosure. For instance, in some embodiments the media content 710 includes media associated with the title of the event (e.g., media content associated with lacrosse), associated with a location of the event (e.g., media content associated with Eagle Park or previous visits to the Park), media content associated with attendees of the event, or a combination thereof.

While the present implementation depicts a calendar event, the present disclosure is not limited thereto. For instance, in some implementations the user instructs the device to provide miscellaneous information unrelated to a media file (e.g., an instruction to provide weather information, an instruction to provide driving instructions, an instruction for information related to a location, etc.). Accordingly, the first region 702 provides text based information such as driving instructions or weather information, while the second region 704 provides media content 710 related to the provided instruction (e.g., a map of driving instructions, a live feed of weather in a current location, images of a location, etc.)

Figure 7B:
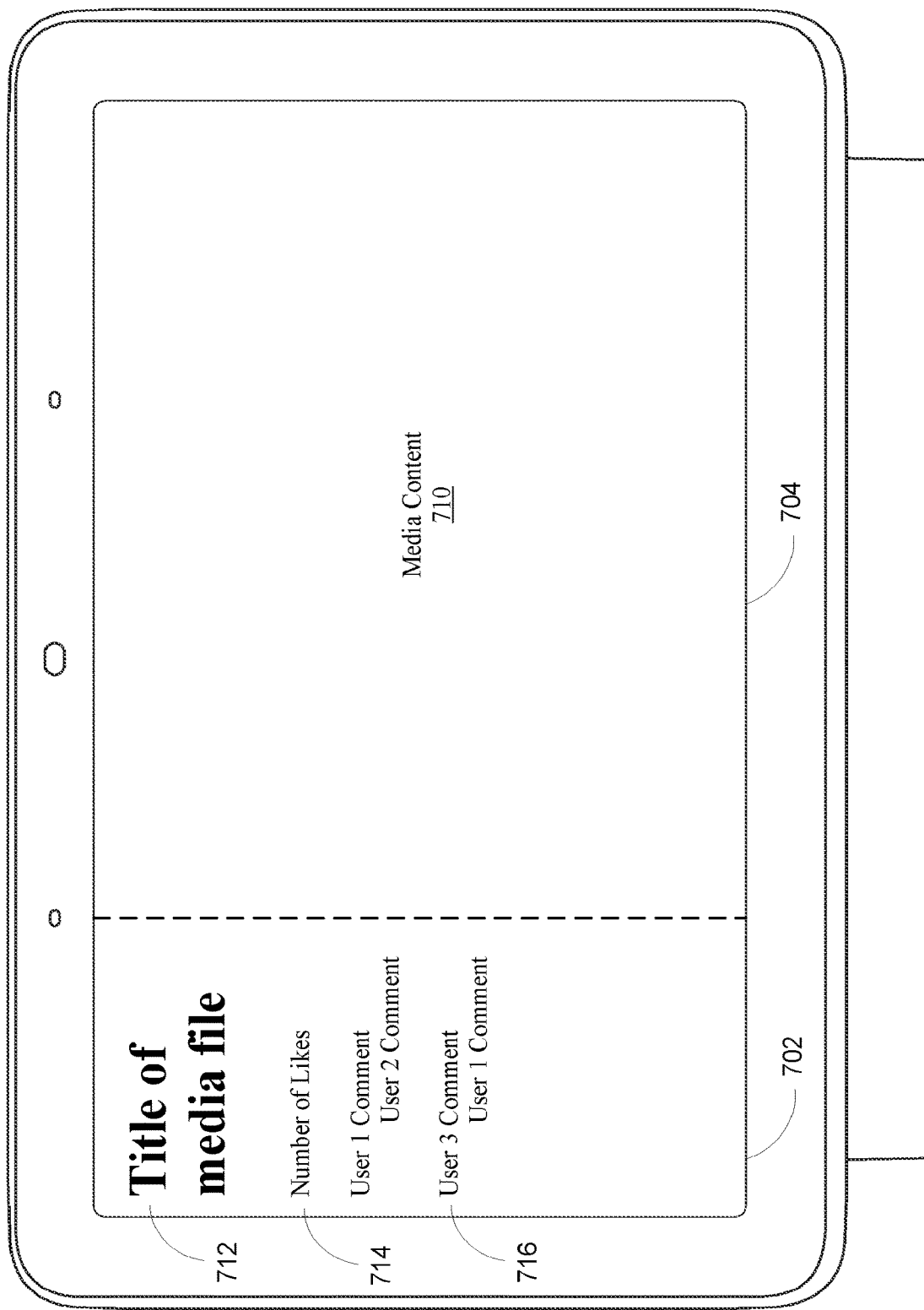

Referring to FIG. 7B, another implementation of a user interface is provided. In this user interface, the first region 702 provides information related to the current media content 710. This information includes a tile of the media file 712, a number of likes (e.g., hearts) associated with the media file, and various user comments overlaid on the media file.

While various provided user interfaces depict a first region 702 and a second region 704 that are split about a vertical axis of the local device, the present disclosure is not limited thereto. For instance, in some implementations the first region and the second region 704 are split about a horizontal axis. Furthermore, in some implementations the first region 702 is not visible to a user unless the user instructs to same this region visible (e.g., taps the display of the device, instructs the device to show all comments, etc.). In some implementations, the first region 702 overlays the second region 704 such that portion of the media content 710 are visible as a background to the information of the first region. Similarly, in some implementations the media content 720 is modified to a size of the second region 704.

In some implementations, a first user sets up (e.g., preconfigure) a local device for a second user (e.g., a gift for a family member). In some embodiments, the first user shares media files with the second user (e.g., share an album) that is then accessible to the second user. Through the preconfiguration of the device, the second user may display the shared media files with limited setup and configuring. For instance, the shared media files may be immediately selected to the second user upon setup of the local device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The above description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed:

1. A method comprising:
   receiving, by a computing device, a user input, wherein:
   the computing device is configured to operate in at least one mode of a plurality of modes;
   while operating in a first mode of the plurality of modes, the computing device displays a plurality of media files; and
   while operating in a second mode of the plurality of modes for a period of time prior to becoming inactive, the computing device displays a subset of media files from the plurality of media files;
   responsive to determining that the user input includes a user query:
   accessing, by the computing device, a subset of media files from a plurality of media files;
   sequentially displaying, by the computing device, each media file from the accessed subset of media files, wherein the operating in the second mode comprises the sequentially displaying the accessed subset of media files until a predetermined period of time has elapsed and the accessed subset of media files has been displayed a predetermined number of times,
   wherein the predetermined period of time for displaying the accessed subset of media files and an interval of time that each media file of the accessed subset of media files is to be displayed are determined as functions of a number of media files in the accessed subset of media files; and when the computing device is not operating in the second mode:

accessing, by the computing device, the plurality of media files; and sequentially displaying, by the computing device, the accessed plurality of media files, wherein the operating in the first mode comprises the sequentially displaying the accessed plurality of media files.

2. The method as recited in claim 1, wherein the plurality of media files comprises one or more media files that are publicly accessible and one or more media files that are associated with a user of the computing device.

3. The method as recited in claim 1, wherein the plurality of media files comprises two or more media files that are associated with any one of a plurality of users of the computing device.

4. The method as recited in claim 1, wherein the user input comprises a request to display the subset of media files for the predetermined period of time.

5. The method as recited in claim 1, wherein the user query specifies subject matter to include in the subset of media files.

6. The method as recited in claim 1, wherein the user input corresponds to an audio input or a touch input.

7. A computing device comprising:

memory configured to store computer-executable instructions; and one or more processing devices in communication with the memory, where the one or more processing devices are configured to execute the computer-executable instructions to perform operations comprising:

receiving a user input, wherein:

the computing device is configured to operate in at least one mode of a plurality of modes;

while operating in a first mode of the plurality of modes, the computing device causes display of a plurality of media files; and while operating in a second mode of the plurality of modes for a period of time prior to becoming inactive, the computing device causes display of a subset of media files from the plurality of media files;

responsive to determining that the user input includes a user query:

accessing a subset of media files from a plurality of media files;

causing sequentially displaying each media file from the accessed subset of media files, wherein the operating in the second mode comprises the causing sequentially displaying the accessed subset of media files until a predetermined period of time has elapsed and the accessed subset of media files has been displayed a predetermined number of times, wherein the predetermined period of time for displaying the accessed subset of media files and an interval of time that each media file of the accessed subset of media files is to be displayed are determined as functions of a number of media files in the accessed subset of media files; and when the computing device is not operating in the second mode:

accessing the plurality of media files; and causing sequentially displaying the accessed plurality of media files, wherein the operating in the first mode comprises the causing sequentially displaying the accessed plurality of media files.

8. The computing device as recited in claim 7, wherein the plurality of media files comprises one or more media files that are publicly accessible and one or more media files that are associated with a user of the computing device.

9. The computing device as recited in claim 7, wherein the plurality of media files comprises two or more media files that are associated with any one of a plurality of users of the computing device.

10. The computing device as recited in claim 7, wherein the user input comprises a request to display the subset of media files for a period of time that each media file of the accessed subset of media files is to be displayed as a function of a number of media files in the accessed subset of media files.

11. The computing device as recited in claim 7, wherein the user query specifies subject matter to include in the subset of media files.

12. The computing device as recited in claim 7, wherein the user input corresponds to an audio input or a touch input.

13. One or more non-transitory, processor-readable media storing processor-executable instructions that, when executed by a computing device, cause the computing device to perform operations comprising:

receiving a user input, wherein:

the computing device is configured to operate in at least one mode of a plurality of modes;

while operating in a first mode of the plurality of modes, the computing device causes display of a plurality of media files; and while operating in a second mode of the plurality of modes for a period of time prior to becoming inactive, the computing device causes display of a subset of media files from the plurality of media files;

responsive to determining that the user input includes a user query:

accessing a subset of media files from a plurality of media files;

causing sequentially displaying each media file from the accessed subset of media files, wherein the operating in the second mode comprises the causing sequentially displaying the accessed subset of media files until a predetermined period of time has elapsed and the accessed subset of media files has been displayed a predetermined number of times, wherein the predetermined period of time for displaying the accessed subset of media files and an interval of time that each media file of the accessed subset of media files is to be displayed are determined as functions of a number of media files in the accessed subset of media files; and when the computing device is not operating in the second mode:

accessing the plurality of media files; and causing sequentially displaying the accessed plurality of media files, wherein the operating in the first mode comprises the causing sequentially displaying the accessed plurality of media files.

14. The one or more non-transitory, processor-readable media as recited in claim 13, wherein the plurality of media files comprises one or more media files that are publicly accessible and one or more media files that are associated with a user of the computing device.

15. The one or more non-transitory, processor-readable media as recited in claim 13, wherein the plurality of media files comprises two or more media files that are associated with any one of a plurality of users of the computing device.

16. The one or more non-transitory, processor-readable media as recited in claim 13, wherein the user input comprises a request to display the subset of media files for the predetermined period of time.

17. The one or more non-transitory, processor-readable media as recited in claim 13, wherein the user query specifies subject matter to include in the subset of media files.

* * * * *